(12) United States Patent
Shelby et al.

(10) Patent No.: US 7,273,894 B2
(45) Date of Patent: *Sep. 25, 2007

(54) COMPOSITIONS FOR THE PREPARATION OF VOID-CONTAINING ARTICLES

(75) Inventors: Marcus David Shelby, Kingsport, TN (US); Tony Wayne Helton, Kingsport, TN (US); Emerson Eston Sharpe, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/942,719

(22) Filed: Sep. 16, 2004

(65) Prior Publication Data

US 2005/0118406 A1 Jun. 2, 2005

Related U.S. Application Data

(60) Provisional application No. 60/526,305, filed on Dec. 2, 2003.

(51) Int. Cl.
*C09J 9/00* (2006.01)

(52) U.S. Cl. ............. 521/134; 521/84.1; 521/136; 521/137; 521/138; 521/139; 521/146; 521/147; 428/317.9

(58) Field of Classification Search .......... 521/50, 521/84.1, 134, 136, 137, 138, 139, 146, 147; 428/317.9
See application file for complete search history.

(56) References Cited

U.S. PATENT DOCUMENTS

| | | | |
|---|---|---|---|
| 3,426,754 A | 2/1969 | Bierenbaum et al. | |
| 3,849,530 A | 11/1974 | Wyeth et al. | |
| 3,944,699 A | 3/1976 | Mathews et al. | |
| 4,138,459 A | 2/1979 | Brazinsky et al. | |
| 4,318,950 A | 3/1982 | Takashi et al. | |
| 4,582,752 A | 4/1986 | Duncan | |
| 4,632,869 A | 12/1986 | Park et al. | |
| 4,770,931 A | 9/1988 | Pollock et al. | |
| 4,771,108 A * | 9/1988 | Mackenzie | |
| 4,965,123 A | 10/1990 | Swan et al. | |
| 5,084,334 A | 1/1992 | Hamano et al. | |
| 5,091,236 A | 2/1992 | Keller et al. | |
| 5,156,905 A * | 10/1992 | Bagrodia et al. ............ 442/401 |
| 5,176,954 A | 1/1993 | Keller et al. | |
| 5,290,631 A | 3/1994 | Fleury et al. | |
| 5,354,595 A * | 10/1994 | Yamamoto et al. ......... 428/147 |
| 5,435,955 A | 7/1995 | Kamei et al. | |
| 5,811,493 A | 9/1998 | Kent | |
| 5,843,578 A | 12/1998 | Sasaki et al. | |
| 6,004,664 A | 12/1999 | Sasaki et al. | |
| 6,054,209 A | 4/2000 | Imanishi et al. | |
| 6,287,680 B1 | 9/2001 | Sasaki et al. | |
| 6,500,533 B1 | 12/2002 | Kong et al. | |
| 6,627,695 B2 | 9/2003 | Murschall et al. | |
| 6,635,340 B2 | 10/2003 | Peiffer et al. | |
| 6,720,085 B2 | 4/2004 | Ito et al. | |
| 6,863,939 B2 * | 3/2005 | Laney et al. ............. 428/32.16 |
| 2001/0036545 A1 | 11/2001 | Nishi et al. | |
| 2003/0068453 A1 | 4/2003 | Kong | |
| 2003/0165671 A1 | 9/2003 | Hashimoto et al. | |
| 2003/0170427 A1 | 9/2003 | Ito et al. | |
| 2003/0180560 A1 | 9/2003 | Peiffer et al. | |
| 2004/0121910 A1 | 6/2004 | Laney et al. | |
| 2004/0185198 A1 * | 9/2004 | Sisson et al. | |

FOREIGN PATENT DOCUMENTS

| | | |
|---|---|---|
| EP | 0 044 616 A1 | 1/1982 |
| EP | 0 194 058 A2 | 9/1986 |
| EP | 0 203 739 A1 | 12/1986 |
| EP | 0203739 A1 | 12/1986 |
| EP | 0 214 859 A2 | 3/1987 |
| EP | 0 522 758 A | 1/1993 |
| EP | 0 581 970 B1 | 8/1998 |
| EP | 1 304 219 A1 | 4/2003 |
| EP | 1 340 609 A2 | 9/2003 |
| EP | 1 340 785 A2 | 9/2003 |
| EP | 1 431 055 A2 | 6/2004 |
| GB | 2 393 418 A | 3/2004 |
| JP | 53-27307 B | 8/1978 |
| JP | 61-037827 A | 2/1986 |
| JP | 63-193822 A | 8/1988 |
| JP | 3-178421 A | 8/1991 |

(Continued)

OTHER PUBLICATIONS

"Adhesives for Low Energy Surfaces", Nov. 11, 2002, 3 pages.*

(Continued)

*Primary Examiner*—Hai Vo
(74) *Attorney, Agent, or Firm*—Eric D. Middlemas; Bernard J. Graves, Jr.

(57) ABSTRACT

Disclosed are novel compositions for the preparation of void-containing articles comprising a polymer matrix and a voiding agent The voiding agent comprises at least one first polymer and at least one second polymer, which are selected on the basis of physical properties such as glass transition temperature, tensile modulus, melting point, surface tension, and melt viscosity. Shaped articles such as sheet, film, bottles, tubes, labels, and sleeves may prepared from these compositions. Also disclosed are polyester shrink films prepared using a voiding agent comprising a novel blend of cellulosic and olefinic polymers. The resulting shrink films have better opacity, lower density, reduced shrink force, and improved printability as compared with most standard voiding agents. The films are useful for sleeve label and other shrink film applications and their lower density allows them to be readily separated from soft drink bottles, food containers and the like during recycling operations.

28 Claims, No Drawings

FOREIGN PATENT DOCUMENTS

| | | |
|---|---|---|
| JP | 4-153233 A | 5/1992 |
| JP | 5-104630 A | 4/1993 |
| JP | 5-194773 A | 8/1993 |
| JP | 5-279494 A | 10/1993 |
| JP | 5-345398 A | 12/1993 |
| JP | 6-166133 A | 6/1994 |
| JP | 6-271747 A | 9/1994 |
| JP | 7-53756 A | 2/1995 |
| JP | 11-12377 A | 1/1999 |
| JP | 11-263854 A | 9/1999 |
| JP | 2000-17093 A | 1/2000 |
| JP | 2000-290356 A | 10/2000 |
| JP | 3139533 B2 | 12/2000 |
| JP | 2001-71441 A | 3/2001 |
| JP | 2001-219519 A | 8/2001 |
| JP | 2001-301023 A | 10/2001 |
| JP | 2002-60531 A | 2/2002 |
| JP | 2003-159773 A | 6/2002 |
| JP | 2002-278460 A | 9/2002 |
| JP | 2003-154619 A | 5/2003 |
| JP | 2003-267437 A | 9/2003 |
| JP | 2003-292592 A | 10/2003 |
| JP | 2003-340922 A | 12/2003 |
| JP | 2004-181863 A | 7/2004 |
| JP | 2004-209905 A | 7/2004 |
| WO | WO 00/69962 A1 | 11/2000 |
| WO | WO 01/58684 A1 | 8/2001 |
| WO | WO 03/013833 A | 2/2003 |
| WO | WO 03/029002 A1 | 4/2003 |

OTHER PUBLICATIONS

PCT International Search Report and Written Opinion for PCT/US2004/038591 dated Apr. 18, 2005.
PCT International Search Report and Written Opinion for PCT/US2004/038592 dated Apr. 18, 2005.
U.S. Appl. No. 10/905,532, Shelby et al.
U.S. Appl. No. 10/942,339, Shelby et al.
Derwent Abstract 1993-002710.
Derwent Abstract 2002-123291.
Derwent Abstract 2002-207165.
Derwent Abstract 2002-330958.
Derwent Abstract 2002-330959.
Shih, *Poly.Eng.Sci.*, 34, 1121 (1994).
Wu, Souheng, *Polymer Handbook*, Edited by Brandrup et al, John Wiley & Sons, (1989) pp. 411-434.
W.C. Young, Roark's Formulas for Stress and Strain, 6th Edition, McGraw-Hill, New York, p. 689 (1989).
International Search Report and Written Opinion for PCT/US2005/042469 dated May 19, 2006 (08214-02).
Office Communication from USPTO dated Nov. 15, 2006, relating to U.S. Appl. No. 10/942,339 filed on Sep. 16, 2004 (80031-02).

* cited by examiner

COMPOSITIONS FOR THE PREPARATION OF VOID-CONTAINING ARTICLES

CROSS REFERENCES TO RELATED APPLICATIONS

This application claims the benefit of U.S. provisional application Ser. No. 60/526,305, filed Dec. 2, 2003.

FIELD OF THE INVENTION

This invention pertains to compositions for the preparation of void-containing shaped articles. More specifically, this invention pertains to a composition comprising a polymer matrix and a voiding agent. The voiding agent comprises at least one first polymer and at least one second polymer, which have selected physical properties such as glass transition temperature, tensile modulus, melting point, surface tension, and melt viscosity. The invention further pertains to shaped articles such as sheet, film, bottles, tubes, labels, and sleeves prepared from these compositions.

BACKGROUND OF THE INVENTION

Shaped articles such as, for example, sheet, film, tubes, bottles, sleeves, and labels, are commonly used in various packaging applications. For example, film and sheet produced from polymers such as polyolefins, polystyrene, poly (vinyl chloride), polyesters and the like are used frequently for the manufacture of shrink labels for plastic beverage or food containers. It is desirable in many packaging applications that the shaped article exhibit properties such as, for example, good printability, high opacity, low density, low shrink force, good texture, recyclability, and high stiffness. For example, during recycling of the plastic material, labels are often separated from the rest of the container because of the presence of inks, glues, and other substances which can contaminant and discolor the recycled polymer. If the density of the label polymer is sustantially different from that of the container polymer, the separation of the label polymer may be carried out by a simple and economical flotation process in which the label polymer floats or sinks away from the other polymers. Unfortunately, the label and container, materials used in packaging often have similar densities that prevents the use of such flotation processes.

One approach for reducing the density is to introduce many small voids or holes into the shaped article. This process is called "voiding" and may also be referred to as "cavitating" or "microvoiding". Voids are obtained by incorporating about 5 to about 50 weight % of small organic or inorganic particles or "inclusions" (referred in the art as "voiding" or "cavitation" agents) into a matrix polymer and orienting the polymer by stretching in at least one direction. During stretching, small cavities or voids are formed around the voiding agent. When voids are introduced into polymer films, the resulting voided film not only has a lower density than the non-voided film, but also becomes opaque and develops a a paper-like surface. This surface also has the advantage of increased printability; that is, the surface is capable of accepting many inks with a substantially greater capacity over a non-voided film. Typical examples of voided films are described in U.S. Pat. Nos. 3,426,754; 3,944,699; 4,138,459; 4,582,752; 4,632,869; 4,770,931; 5,176,954; 5,435,955; 5,843,578; 6,004,664; 6,287,680; 6,500,533; 6,720,085; U.S. Patent Application Publication No.'s 2001/ 0036545; 2003/0068453; 2003/0165671; 2003/0170427; Japan Patent Application No.'s 61–037827; 63–193822; 2004–181863; European Patent No. 0 581 970 B1, and European Patent Application No. 0 214 859 A2.

Although voided films are known, they frequently suffer from a number of shortcomings and often show inferior properties to the corresponding non-voided counterparts such as, for example, poor stiffness, insufficient opacity, high shrink force, and high surface roughness which make them less desirable for many packaging applications. For packaging labels, for example, it is often desirable for aesthetic purposes to have a high concentration of voids such that the voided film is opaque. Increasing the number of voids, however, can increase the surface roughness to the point that the printing quality, texture and feel, and seamability of the label are reduced. To address this problem, many voided films have multiple layers in which a non-voided surface layer is affixed to a void-containing core layer (by adhesion or coextrusion). The non-voided layer is applied because it provides a smoother surface than the voided layer. While this approach solves many of the above problems, production of such multilayer films is expensive and requires additional coextrusion or lamination equipment. Multilayered films also typically have a higher overall film density because of the lack of or decreased voiding on the surface and are not as desirable as monolayer films. It is also possible to introduce voids into containers such as, for example, a bottle or thermoformed tray. Voided containers are lightweight, require less polymer, and can be printed upon directly, thus eliminating the need for a label.

Conventional voiding agents suffer from several disadvantages. Inorganic agents like calcium carbonate, talc, silica, and the like may be used as voiding agents but, because inorganic substances are typically dense materials, the final density of the shaped article is often too high. In the case of voided films, for example, the reduction in density imparted by voiding is frequently offset by the weight of the inorganic agents.

Polyolefins such as, for example, polypropylene may be used as a voiding agents. Polyolefins, however, often do not disperse well and may require a compatibilizer such as, for example, a carboxylated polyethylene to obtain a uniform distribution of voids. When used with polyester polymers to produce voided films, polyolefins also tend to lower the polyester film surface tension and thereby reduce the printability of the film. Polyolefins are softer than the polyester at room temperature which sometimes lowers the overall film modulus to unacceptable levels. Finally, polyolefins are relatively inefficient voiding agents and large amounts are required to achieve the necessary density reduction. As discussed earlier, this leads to poor surface roughness and printing problems, thus making it difficult to use in single layer films.

Other polymeric voiding agents such as, for example, styrenics, polymethylpentene, polycarbonate, nylons, cellulosics, and the like, suffer from some of the same voiding efficiency problems as polyolefins. High modulus styrenics, like atactic polystyrene, are efficient voiding agents, but suffer from outgassing problems when mixed and processed at higher temperatures and, therefore, are useful only at low levels. Styrenics also tend to embrittle the film. Crosslinked styrene beads may be used to circumvent this problem, although these beads tend to be expensive. Cellulosics tend to be hygroscopic and require a separate drying and moisture removal step before incorporation into the polymer matrix. For voided shrink films, cellulosics also tend to produce undesirably high shrink forces.

There is a need, therefore, for a composition that would enable the production of voided, shaped articles such as, for example, film, sheet, bottles, tubes, fibers, and rods, having a lower density, good printability, lower shrink force, high opacity, and other desirable physical properties such as high stiffness and good texture and feel. In the case of films, there is a also need for a composition that would permit the preparation of single layer, void-containing films with acceptable printability, stiffness, and lower densities. Such a composition would have utility in the beverage and food packaging industry for the production of void-containing shrink labels.

SUMMARY OF THE INVENTION

We have discovered a composition comprising a polymer matrix and a voiding agent that is useful for the preparation of void-containing articles. The voiding agent comprises at least 2 polymers which have specified properties of glass transition temperature or melting point, tensile modulus, surface tension, and melt viscosity. Thus, the present invention provides a composition for the preparation of void-containing articles, comprising:

(i) a polymer matrix comprising one or more of: polyesters, polylactic acid, polyketones, polyamides, polysulfones, fluoropolymers, polyacetals, polyimides, polycarbonates, olefinic polymers, and copolymers thereof; wherein the polymer matrix has a glass transition temperature (Tg) of at least 50° C.;

(ii) a voiding agent dispersed within the polymer matrix, comprising at least one first polymer and at least one second polymer, wherein the first polymer has a Tg or a melting point temperature (Tm) greater than the Tg of the polymer matrix, a tensile modulus of at least 1 GPa, and a surface tension that differs from the surface tension of the polymer matrix by an absolute value of 5 dynes/cm or less; and the second polymer has a surface tension that differs from the surface tension of the polymer matrix by an absolute value of at least 5 dynes/cm and a melt viscosity wherein the ratio of melt viscosity of the second polymer to the melt viscosity of the polymer matrix is about 0.1 to about 3.5.

Our composition efficiently forms voids on stretching in one or more directions at or above the Tg of the matrix polymer at a stretch ratio of at least 1.5.

The composition of the invention comprises a polymer matrix which may be selected from a wide range of polymers including, but not limited to, polyesters, polyester blends, polyamides, polycarbonates, and olefinic polymers such as, for example, (polyvinyl) chloride (abbreviated herein as "PVC"), poly(acrylonitrile)s, acrylic polymers, polyacetals, fluoropolymers, styrenic polymers, and copolymers thereof. In addition to the polymer matrix, our novel composition includes a voiding agent that comprises at least one first polymer and at least one second polymer that are selected on the basis of selected physical properties and the relationship of these properties to corresponding properties of the polymer matrix. These parameters include the glass transition temperature (abbreviated herein as "Tg") or melting point temperature (abbreviated herein as "Tm"), tensile modulus, surface tension, and melt viscosity. This combination of a first and second polymer provides superior performance over either polymer component alone. The voiding agent provides more efficient voiding than other known voiding agents, reduces cost, and improves processability for the articles manufactured from the composition of the invention. Our novel voiding agent also gives these articles a higher opacity and a good texture and feel. When the article is a shrink film or a sleeve prepared from a shrink film, the voiding agent provides an additional advantage of reducing shrink forces over that of the non-voided film.

Our invention, thus, includes shaped articles comprising an oriented polymer with a voiding agent dispersed therein. Thus, another embodiment of the present invention is a void-containing, shaped article comprising an oriented polymer matrix having dispersed therein a voiding agent comprising at least one first polymer and at least one second polymer, wherein the first polymer comprises one or more of: microcrystalline cellulose, a cellulose ester, or a cellulose ether, has a Tg or a Tm greater than the Tg of the polymer matrix, and a surface tension that differs from the surface tension of the polymer matrix by an absolute value of 5 dynes/cm or less; and the second polymer comprises one or more polymers selected from the group consisting of polyethylene, polystyrene, polypropylene, and copolymers thereof, has a surface tension that differs from the surface tension of the polymer matrix by an absolute value of at least 5 dynes/cm, and a melt viscosity wherein the ratio of melt viscosity of the second polymer to the melt viscosity of the polymer matrix is about 0.1 to about 3.5. The shaped articles may be produced by extrusion, calendering, thermoforming, blow-molding, casting, spinning, drafting, tentering, or blowing. Examples of such shaped articles include fibers, sheets, films, tubes, bottles, or profiles. For example, our voiding agent is useful for the production of films which further may be biaxially or uniaxially oriented to provide high quality voided shrink films which, in turn, may comprise one or more layers. These shrink films have excellent opacity, good film stiffness, a low shrink force, improved seamability, good printability, and high shrinkage. These films are particularly useful as labels and in other packaging applications.

DETAILED DESCRIPTION

The present invention provides the present invention provides a composition for the preparation of void-containing articles, comprising:

(i) a polymer matrix comprising one or more of: polyesters, polylactic acid, polyketones, polyamides, polysulfones, fluoropolymers, polyacetals, polyimides, olefinic polymers, polycarbonates, and copolymers thereof; wherein the polymer matrix has a glass transition temperature (Tg) of at least 50° C.;

(ii) a voiding agent dispersed within the polymer matrix comprising at least one first polymer and at least one second polymer, wherein the first polymer has a Tg or a melting point temperature (Tm) greater than the Tg of the polymer matrix, a tensile modulus of at least 1 GPa, and a surface tension that differs from the surface tension of the polymer matrix by an absolute value of 5 dynes/cm or less; and the second polymer has a surface tension that differs from the surface tension of the polymer matrix by an absolute value of at least 5 dynes/cm and a melt viscosity wherein the ratio of melt viscosity of the second polymer to the melt viscosity of the polymer matrix is about 0.1 to about 3.5.

The composition of the present invention comprises a polymer matrix, which may be selected from a wide variety of polymers, and a voiding agent which provides more efficient voiding, that is, a high number of uniformly sized voids per unit weight of voiding agent. Our composition is useful for the preparation of shaped articles such as, for example, fibers, tubes, sheets, films, bottles and profiles, which may be may be uniaxially or biaxially oriented and, optionally, may be heatset In particular, our composition is useful for the production of films which may be biaxially or uniaxially oriented to provide high quality voided shrink films. Such films or other shaped articles may be single-layered or multilayered. For example, the shaped article may be a laminate or a coextruded film in which a voided layer is incorporated as one or more layers of a multilayered structure.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The composition of the present invention are useful for the preparation of void-containing articles and comprises a polymer matrix and a voiding agent dispersed within the polymer matrix. The terms "voids", "microvoids", and "microporous", as used herein, are intended to be synonymous and are well-understood by persons skilled in the art to mean tiny, discrete voids or pores contained within the polymer below the surface of the article that are intentionally created during the manufacture of the article. Similarly, the terms "voided", "microvoided", "cavitated" and "void-containing", as used herein in reference to the compositions, polymers, and shaped articles of the invention, are intended to be synonymous and mean "containing tiny, discrete voids or pores". The composition of the invention includes a "voiding agent" dispersed within the polymer matrix. The term "voiding agent", as used herein, is synonomous with the terms "voiding composition", "microvoiding agent", and "cavitation agent" and is understood to mean a substance dispersed within a polymer matrix that is useful to bring about or cause the formation voids within the polymer matrix" upon orientation or stretching of the polymer matrix. The term "polymer matrix", as used herein, is synonymous with the term "matrix polymer" and refers to one or more polymers providing a continuous phase in which the voiding again may be dispersed such that the particles of the voiding agent are surrounded and contained by the continuous phase.

The polymer matrix of the composition may be selected from a range of polymers and may comprises a single polymer or a blend of one or more polymers. To produce shaped articles with adequate stiffness, the polymer matrix typically has a glass transition temperature (abbreviated herein as "Tg") of at least 50° C. Non-limiting examples of polymers which may comprise the polymer matrix of our composition include one or more polyesters, polylactic acid, polyketones, polyamides, olefinic polymers, fluoropolymers, polyacetals, polysulfones, polyimides, polycarbonates, or copolymers thereof. The term "olefinic polymer", as used herein is intended to mean a polymer resulting from the addition polymerization of ethylenically unsaturated monomers such as, for example, polyethylene, polypropylene, polystyrene, poly(acrylonitrile)s, poly(acrylamide), acrylic polymers, poly(vinyl acetate), poly(vinyl chloride), and copolymers of these polymers. The composition of the instant invention forms voids on orientation or stretching at a temperature at or above the Tg of the matrix polymer. Stretching may be carried out in one or more directions at a stretch ratio of at least 1.5. The composition, thus, may be "uniaxially stretched", meaning the polymer matrix is stretched in one direction or "biaxially stretched," meaning the polymer matrix has been stretched in two different directions.

The voiding agent comprises a first and second polymer that may be selected in accordance with specified physical properties of glass transition temperature or melting point, surface tension, modulus, and melt viscosity, and their relationship to the corresponding properties of the polymer matrix. Therefore, to generate voids efficiently within the polymer matrix, it is desirable that the first polymer have a hardness that is greater than the matrix polymer at the stretch temperature. In other words, the first polymer should have a tensile modulus at room temperature that is at least 1 GPa and a melt transition temperature, also known as "melting point" (abbreviated hereinafter as "Tm") or a Tg that is higher than the Tg of the polymer matrix. For crystalline polymers, Tm is the temperature at which crystalline domains lose their structure, or melt, and the modulus drops precipitously. For amorphous polymers, Tg is the temperature below which amorphous domains lose the structural mobility of the polymer chains and become rigid glasses. Some polymers, particularly many elastomeric block copolymers such as, for example, polyesterethers, have a high melting point in one phase, but still have too low of a modulus to induce any significant amount of voiding.

Thus, as an example, if the first polymer is a crystalline polymer, its Tm should be higher than the Tg of the matrix polymer. Similarly, if the first polymer is amorphous then its Tg should be higher than the Tg of the polymer matrix. When the Tg or Tm of the first polymer is greater than the Tg of the polymer matrix, the particles of the voiding agent tend to be "harder" than the polymer matrix which enables the efficient formation of voids within the polymer matrix during stretching. For example, if the polymer matrix is a copolyester with a Tg of about 74° C. to about 77° C. (165 to 170° F.), the first polymer of our voiding agent may be a styrenic polymer (Tg=100° C. or higher). Amorphous polymers typically exhibit only a glass transition temperature as measured by well-known techniques such as, for example, by differential scanning calorimetry using ASTM Method D3418. In one embodiment of the invention, the first and second polymers of the voiding agent are not crosslinked polymers.

The dispersion of the voiding agent within the polymer matrix is improved if the surface tension of the first and second polymer components are maintained within certain values relative to the polymer matrix. Thus, in accordance with the invention, the first polymer component of the voiding agent has a surface tension that differs from the surface tension of the polymer matrix by an absolute value of 5 dynes/cm or less and the surface tension the second polymer component differs from the surface tension of the polymer matrix by an absolute value of at least 5 dynes/cm. Further examples of the difference in surface tension which may be exhibited between the first polymer and the polymer matrix are an absolute value of 4 dynes/cm or less and an absolute value of 3 dynes/cm or less. Further examples of the difference in surface tension which may be exhibited between the second polymer and the polymer matrix are an absolute value of at least 6 dynes/cm and an absolute value of at least 7 dynes/cm. Surface tension (also referred to as "critical surface tension") may be determined from the published literature or measured according to procedures well-known in the art such as, for example, by sessile drop methods or by the Zisman critical surface method (for example, by using Accudyne™ dyne marker pens). The latter method gives the "critical surface tension" and is effectively the fluid surface tension where full wetting occurs based on a series of test fluids each having a different known surface tension. Critical surface tension and total surface tension by other methods are approximately the same, but when different, the critical surface tension values should be used for consistency. To further impart good dispersion of the voiding agent within the polymer matrix, the ratio of melt viscosity of the second polymer to the melt viscosity of the polymer matrix may be about 0.1 to about 3.5. This ratio is defined as the melt viscosity of the second polymer, divided by the melt viscosity of the matrix at the temperature of mixing. Typically, a value at a shear rate of $1\ s^{-1}$ is used as determined from dynamic or steady state parallel plate or cone and plate viscometry. This number is approximately the "zero shear" viscosity. In another example, the ratio of melt viscosity of the second polymer to the melt viscosity of the polymer matrix may be about 0.5 to about 2.0. Typically, the melt viscosities of the polymers of the present invention show Newtonian behavior (i.e., non-shear thinning) over a broad shear range (including that seen in an extruder).

The first polymer typically has an average particle size of about 0.01 to about 50 μm after dispersion in the polymer matrix. This particle size range permits the voiding agent to be uniformly dispersed throughout the matrix polymer. Additional examples of average particle sizes for the first polymer of the voiding agent are about 0.01 to about 40 and about 0.1 to about 10 μm. The term "average particle size", as used herein, means the sum of the diameters of all the particles divided by the total number of particles. The average particle size of the first polymer may be measured by optical or electron microscopy using techniques known to persons skilled in the art. Typically, the microscopy measurement is conducted by measuring the diameters of a small, representative sample of particles containing, typically, 100 to 500 particles, and then calculating the average diameter by dividing the sum of the diameters by the number of particles. The microscopy measurement of particle diameters may be carried out manually or by using automated instrumentation and procedures well known to persons skilled in the art.

It may be desirable in many applications that the voiding agent impart a high level of opacity to the matrix polymer. Opacity may be enhanced by increasing the absolute value of the difference in the refractive indices of each of the first and second polymers and the polymer matrix. Thus, it is advantageous that the first polymer and the second polymer have a refractive index that differs from the refractive index of the polymer matrix by an absolute value at least 0.02. Other examples of differences in the absolute value between the refractive index of the polymer matrix and the first polymer or the second polymer of the voiding agent are 0.04 and 0.06. The refractive index of the polymer matrix and the first polymer may be determined with an Abbe™ or Metricon™ refractometer using techniques well known in the art or may be obtained from the published literature. For example, the refractive index may be measured using a Metricon™ prism coupler with a 633 nm wavelength laser.

The first and second polymer components of the voiding agent may be selected from a wide range of polymers. The first polymer may be a single polymer or blend of one or more polymers. For example, the first polymer may comprise one or more polymers selected from cellulosic polymers, starch, esterified starch, polyketones, fluoropolymers, polyacetals, polyesters, polyamides, polysulfones, polyimides, polycarbonates, olefinic polymers, and copolymers of these polymers with other monomers such as, for example, copolymers of ethylene with acrylic acid and its esters. Cellulosic polymers are particularly efficient voiding agents and have surface tensions in the desired range for many typical matrix polymers. Thus, in one example, the first polymer of our novel voiding agent may be a cellulosic polymer and may comprise one or more of microcrystalline cellulose, a cellulose ester; or a cellulose ether. In another embodiment, the first polymer may be a cellulose ester such as, for example, cellulose acetate, cellulose triacetate, cellulose acetate propionate, or cellulose acetate butyrate. In yet another example, the first polymer may be a cellulose ether which may include, but is not limited to, one or more of hydroxypropyl cellulose, methyl ethyl cellulose, or carboxymethyl cellulose.

For the voiding agents of the present invention, we have found that cellulosic polymers such as cellulose acetate, cellulose triacetate, cellulose acetate propionate, cellulose acetate butyrate, cellulose ethers, carboxymethyl cellulose, and the like, are useful as the first polymer component of our voiding agent and are more efficient at creating voids than other standard voiding agents like polypropylene, polystyrene, and the like. Typically, cellulosic polymers have a high Tg and can be used in a large number of polymer matrices while maintaining sufficient hardness at stretching. Cellulosics also disperse well in the polymer matrix and provide an opaque film with uniform hole size distribution. Cellulosics are produced in either powder or pelletized form, and either form may be used in the voiding agent of the invention. For example, our voiding agent may comprise cellulose acetate in powdered form, having an acetyl content from about 28 to 45 weight percent and a falling ball viscosity of between 0.01 and 90 seconds.

Highly crystalline polyester homopolymer powders such as PET, poly(1,3-trimethylene terephthalate), poly(cyclohexylene terephthalate), or poly(1,4-butylene terephthalate) also may be used as the first polymer provided that the Tm of the crystalline polyester is greater than the Tg of the continuous polyester phase. In this embodiment, it is preferred that the polymer matrix have a low enough melt viscosity at a temperature below the crystalline polyester melt temperature. In the case where the polymer matrix is a polyester, it is preferable that the polymer matrix is melt processable at a temperature below the Tm of the crystalline polyester voiding agent; otherwise, the voiding agent may melt and transesterify with the polyester matrix and lose its voiding capability.

The second polymer may comprise one or more polymers selected from polyamides, polyketones, polysulfones, fluoropolymers, polyacetals, polyesters, polycarbonates, olefinic polymers, and copolymers thereof. For example, the second polymer may include, but is not limited to, one or more olefinic polymers such as, for example, polyethylene, polystyrene, polypropylene, and copolymers thereof. Further nonlimiting examples of olefinic copolymers include ethylene vinyl acetate, ethylene vinyl alcohol copolymer, ethylene methyl acrylate copolymer, ethylene butyl acrylate copolymer, ethylene acrylic acid copolymer, and ionomer. In a preferred embodiment, the first polymer comprises one or more of cellulose acetate or cellulose acetate propionate and the second polymer comprises one or more of polystyrene, polypropylene, or ethylene methyl acrylate copolymer. Typically, the voiding agent comprises about 5 to about 95 weight percent of the first polymer, based on the total weight of the voiding agent. Other weight percent ranges for the first polymer within the voiding agent are about 30 to about 60 weight percent and about 50 to about 60 weight percent.

The polymers that may be used as the first polymer, second polymer, and polymer matrix of the present invention may be prepared according to methods well-known in the art or obtained commercially. Examples of commercially available polymers which may be used in the invention include EASTAR™, EASTAPAK™, SPECTAR™, and EMBRACE™ polyesters and copolyesters available from Eastman Chemical Co,; LUCITE™ acrylics available from Dupont; TENITE™ cellulose esters available from Eastman Chemical Co.; LEXAN™ (available from GE Plastics) or MAKROLON™ (available from Bayer) polycarbonates; DELRIN™ polyacetals available from Dupont; K-RESIN™ (available from Phillips) and FINACLEAR™/FINACRYSTAL™ (available from Atofina) styrenics and styrenic copolymers; FINATHENE™ (available from Atofina) and HIFOR™/TENITE™ (available from Eastman) polyethylenes; ZYTEL™ nylons available from Dupont; ULTRAPEK™ PEEK available from BASF; KAPTON™ polyimides available from Dupont; and TEDLAR™ and KYNAR™ fluoropolymers available from Dupont and Atofina, respectively.

Our invention also provides a composition capable of forming voids that comprises a voiding agent dispersed within a polymer matrix. Thus, the present invention provides a composition capable of forming voids, comprising: a polymer matrix and at least one first polymer and at least one second polymer each dispersed within the polymer matrix, wherein the first polymer comprises one or more of: microcrystalline cellulose, a cellulose ester, or a cellulose ether, has a Tg or a Tm greater than the Tg of the polymer matrix, and a surface tension that differs from the surface tension of the polymer matrix by an absolute value of 3 dynes/cm or less; and the second polymer comprises one or more polymers selected from the group consisting of polyethylene, polystyrene, polypropylene, and copolymers thereof, has a surface tension that differs from the surface tension of the polymer matrix by an absolute value of at least 6 dynes/cm, and a melt viscosity wherein the ratio of melt viscosity of the second polymer to the melt viscosity of the polymer matrix is about 0.1 to about 3.5. The first polymer may be cellulosic polymer including, but not limited to microcrystalline cellulose, a cellulose ester, or a cellulose ether. It is desirable but not critical to our invention that the refractive index of the first and second polymers differ from the refractive index of the polymer matrix by an absolute value of at least 0.04. The surface tension of the first polymer differs from that of the polymer matrix by an absolute value of 3 dynes/cm or less while the surface tension of the second polymer differs from that of the polymer matrix by an absolute value of at least 6 dynes/cm. The first and second polymers, Tg's, Tm's, and surface tensions, also include their various embodiments as described hereinabove in accordance with the invention.

The polymer matrix may be selected from a range of polymers and may comprises a single polymer or a blend of one or more polymers. Non-limiting examples of polymers which may comprise the polymer matrix of our composition include one or more polyesters, polylactic acid, polyketones, polyamides, fluoropolymers, polyacetals, polysulfones, polyimides, polycarbonates, olefinic polymers, or copolymers thereof. Typically, the polymer matrix is oriented. The term "oriented", as used herein, means that the polymer matrix is stretched to impart direction or orientation in the polymer chains. The polymer matrix, thus, may be "uniaxially stretched", meaning the polymer matrix is stretched in one direction or "biaxially stretched," meaning the polymer matrix has been stretched in two different directions. Typically, but not always, the two directions are substantially perpendicular. For example, in the case of a film, the two directions are in the longitudinal or machine direction ("MD") of the film (the direction in which the film is produced on a film-making machine) and the transverse direction ("TD") of the film (the direction perpendicular to the MD of the film). Biaxially stretched articles may be sequentially stretched, simultaneously stretched, or stretched by some combination of simultaneous and sequential stretching.

Although not critical, the second polymer may have a Tg or a Tm greater than the Tg of the polymer matrix to improve the voiding efficiency of our invention. The inclusion of a third polymer component, in addition to a first and second polymer in some instances, has been found to increase opacity and, in particular, enhance the dispersion of the first and second polymer components within the polymer matrix. Thus our novel composition further may comprise a third polymer dispersed within the polymer matrix having a a surface tension that is between the surface tension of the polymer matrix and the second polymer, and a density of 1.1 g/cc or less. A difference in refractive index between the third polymer and the polymer matrix by an absolute value of at least 0.04, as discussed above for the first and second polymer components, is desirable but not critical to achieve good opacity for the composition. To enable good dispersion and mixing of the first, second, and third polymer components with the polymer matrix, it is advantageous for the third polymer to have a surface tension that is between that of the polymer matrix and the second polymer. It is also desirable that the density of the third polymer be about 1.1 g/cc or less to reduce the overall density of the composition.

In one embodiment, the first polymer comprises one or more of cellulose acetate or cellulose acetate propionate and the second polymer comprises one or more of polystyrene, polypropylene, or ethylene methyl acrylate copolymer. In another example, the first polymer comprises cellulose acetate, the second polymer comprises polypropylene, and the third polymer comprises ethylene methyl acrylate copolymer.

The composition of our invention may be used to produce shaped articles which contain voids. Thus, another aspect of our invention is a void-containing, shaped article comprising an oriented polymer matrix having dispersed therein a voiding agent wherein the voiding agent comprises at least one first polymer, and at least one second polymer, wherein the first polymer comprises one or more of: microcrystalline cellulose, a cellulose ester, or a cellulose ether, has a Tg or a Tm greater than the Tg of the polymer matrix, and a surface tension that differs from the surface tension of the polymer matrix by an absolute value of 5 dynes/cm or less; and the second polymer comprises one or more polymers selected from the group consisting of polyethylene, polystyrene, polypropylene, and copolymers thereof, has a surface tension that differs from the surface tension of the polymer matrix by an absolute value of at least 5 dynes/cm, and a melt viscosity wherein the ratio of melt viscosity of the second polymer to the melt viscosity of the polymer matrix is about 0.1 to about 3.5. The first and second polymers, polymer matrix, Tg's, Tm's, and surface tensions, also include their various other embodiments as described hereinabove in accordance with the invention.

Typically, the shaped article will comprise at least 50 weight percent polymer matrix based the total weight of said article. The polymer matrix may contain one or more polymers including, but not limited to, polyesters, polylactic acid, polyketones, polyamides, polyacetals, fluoropolymers, polysulfones, polyimides, polycarbonates, olefinic polymers, and copolymers thereof. In one example, the polymer matrix may comprise one or more polyesters such as, for example, poly(ethylene terephthalate), poly(butylene terephthalate), poly(1,3-trimethylene terephthalate), poly(cyclohexylene terephthalate). In addition to the polyesters noted above, the shaped articles of the invention may include polyesters from the condensation one of more aromatic diacids with one or more diols. Examples of polyesters which may be used as the polymer matrix include those comprising (i) diacid residues comprising at least 80 mole percent, based on the total moles of diacid residues, of one or more residues of: terephthalic acid, naphthalenedicarboxylic acid, 1,4-cyclohexanedicarboxylic acid, or isophthalic acid; and (ii) diol residues comprising 10 to 100 mole percent, based on the total moles of diol residues, of one or more residues of 1,4-cyclohexanedimethanol, 1,3-cyclohexanedimethanol, neopentyl glycol, or diethylene glycol; and 0 to 90 mole percent of one or more residues of: ethylene glycol, 1,2-propanediol, 1,3-propanediol, 1,4-butanediol, 1,5-pentanediol, 1,6-hexaned -tetramethyl-1,3-cyclobutanediol, 1,3-cyclohexanedimethanol, bisphenyl A, or polyalkylene glycol. Typically, these copolyesters have a glass transition temperature between about 35° C. and about 150° C.

The voiding agent will comprise at least one first polymer and at least one second polymer. Although, the first polymer may comprise any of the polymers described hereinabove, cellulose acetate, cellulose acetate propionate, or a mixture thereof are preferred. Similarly, the second polymer may comprise any of the polymers described previously but, preferably comprises one or more of polystyrene, polypropylene, or ethylene methyl acrylate copolymer. In yet another example of the shaped article of the invention, the polymer matrix comprises a polyester in which the diacid residues comprise at least 95 mole percent of the residues of terephthalic acid, and the diol residues comprise about 10 to about 40 mole percent of the residues of 1,4-cyclohexanedimethanol, about 1 to about 25 mole percent of the residues of diethylene glycol, and about 35 to about 89 mole percent of the residues of ethylene glycol; the first polymer comprises cellulose acetate; and the second polymer comprises polypropylene and ethylene methyl acrylate copolymer.

Although not critical to our invention, the efficiency of the voiding agent is increased if the second polymer has a Tg or a Tm greater than the Tg of the polymer matrix. In addition, the voiding agent may further comprise a third polymer having a surface tension that is between the surface tension of the polymer matrix and the second polymer and a density of 1.1 g/cc or less.

Typical shaped articles of our invention include fibers, sheets, films, tubes, bottles, and profiles. The shaped article may be produced by any means well known to persons skilled in the art, for example, by extrusion, calendering, thermoforming, blow-molding, casting, spinning, drafting, tentering, or blowing. For example, the shaped article may be shrink film. An example of a shrink film of the invention is one that has one or more layers and a shrinkage of at least 5 percent after 10 seconds in a water bath at 70° C.

Our invention also provides a process for a void-containing, shaped article, comprising: (i) mixing a polymer matrix and a voiding agent at a temperature at or above the Tg of the polymer matrix to form a uniform dispersion of the voiding agent within the polymer matrix, wherein the voiding agent comprises at least one first polymer and at least one second polymer, wherein the first polymer has a Tg or a Tm greater than the Tg of the polymer matrix, a tensile modulus of at least 1 GPa, and a surface tension that differs from the surface tension of the polymer matrix by an absolute value of 5 dynes/cm or less; and the second polymer has a surface tension that differs from the surface tension of the polymer matrix by an absolute value of at least 5 dynes/cm, and a melt viscosity wherein the ratio of melt viscosity of the second polymer to the melt viscosity of the polymer matrix is about 0.1 to about 3.5; (ii) forming a shaped article; (iii) orienting the article; and, (iv) optionally, heatsetting the article of step (iii).

The mixture may be formed by forming a melt of the polymer matrix and mixing therein the voiding agent. The voiding agent may be in a solid, semi-solid, or molten form. It is advantageous that the voiding agent is a solid or semi-solid to allow for rapid and uniform dispersion within the polymer matrix upon mixing.

When the voiding agent is uniformly dispersed in the polymer matrix, a shaped article is formed by processes well known in the art such as, for example, extrusion, calendering, thermoforming, blow-molding, casting, spinning, drafting, tentering, or blowing. For example, if the shaped article is a cast or extruded film, the article may be oriented by stretching in one or more directions using a tenter frame, drafter, or double bubble blown film line. Methods of unilaterally or bilaterally orienting sheet or film are well known in the art. Typically, such methods involve stretching the sheet or film at least in the machine or longitudinal direction after its formation in an amount of about 1.5 to about 10, usually about 3 to about 6, times its original dimension. Such sheet or film may also be stretched in the transverse or cross-machine direction by apparatus and methods well known in the art in amounts of generally about 1.5 to about 10, usually about 3 to about 6, times the original dimension. The oriented films of the invention also may be heatset to control shrinkage or to provide a dimensionally stable film. For example, the polymer matrix may comprise a crystallizable polymer, such as poly(ethylene terephthalate), which after voiding and orientation, is heatset at about 170° C. to about 220° C. to reduce shrinkage and to impart dimensional stability.

If the shaped article is in the form of a bottle, orientation is generally biaxial as the bottle is stretched in all directions as it is blow-molded. Such formation of bottles is also well known in the art and are described, for example, in U.S. Pat. No. 3,849,530.

The voids are formed around the voiding agent as the polymer matrix is stretched at or near the glass transition temperature, Tg, of the polymer. Because the particles of the void-forming compositon are relatively hard compared to the polymer matrix, the polymer matrix separates from and slides over the voiding agent as it is stretched, causing voids to be formed in the direction or directions of stretch in which the voids elongate as the matrix polymer continues to be stretched. Thus, the final size and shape of the voids depends on the direction(s) and amount of stretching. For example, if stretching is only in one direction, voids will form at the sides of the voiding agent in the direction of stretching.

Typically, the stretching operation simultaneously forms the voids and orients the matrix polymer. The properties of the final product depend on and can be controlled by manipulating the stretching time and temperature and the type and degree of stretch. The stretching typically is done just above the glass transition temperature (e.g., Tg+5° C. to Tg+60° C.) of the polymer matrix.

The voiding agent of the present invention is may be used for the preparation voided, shrink films in which the matrix polymer comprises a polyester. Our invention is thus further described and illustrated herein with particular reference to void-containing polyester, shrink films. It is understood that the embodiments decribed for the polyester shrink films also apply to the shaped articles described hereinabove.

The present invention also provides a void-containing shrink film comprising an oriented, continuous polyester phase having dispersed therein a voiding agent comprising at least one first polymer, and at least one second polymer, wherein the first polymer has a glass transition temperature (Tg) or a melting point temperature (Tm) greater than the Tg of the polyester and a surface tension that differs from the surface tension of the polyester by an absolute value of 5 dynes/cm or less; and the second polymer has a surface tension that differs from the surface tension of the polyester by an absolute value of at least 5 dynes/cm, and a melt viscosity wherein the ratio of melt viscosity of said second polymer to the melt viscosity of said polyester is about 0.1 to about 3.5. The first and second polymers, Tg's, Tm's, and surface tensions, also include their respective embodiments in accordance with the invention as described hereinabove.

The void-containing shrink films comprise a polyester as the matrix polymer. The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer or plasticizer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polyesters used in the present invention typically are prepared from dicarboxylic acids and diols which react in substantially equal proportions and are incorporated into the polyester polymer as their corresponding residues. The polyesters of the present invention, therefore, contain substantially equal molar proportions of acid residues (100 mole %) and diol residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % ethylene glycol, based on the total diol residues, means the polyester contains 30 mole % ethylene glycol residues out of a total of 100 mole % diol residues. Thus, there are 30 moles of ethylene glycol residues among every 100 moles of diol residues.

The preferred polyesters for shrink film are amorphous or semicrystalline polymers, or blends, with relatively low crystallinity. Preferably, the polyesters have a substantially amorphous morphology, meaning that the polyesters comprise substantially unordered regions of polymer.

The polyesters that may be used in the films of the present invention comprise (i) diacid residues comprising at least 80 mole percent, based on the total moles of diacid residues, of one or more residues of: terephthalic acid, naphthalenedicarboxylic acid, 1,4-cyclohexanedicarboxylic acid, or isophthalic acid; and (ii) diol residues comprising 10 to 100 mole percent, based on the total moles of diol residues, of one or more residues of 1,4-cyclohexanedimethanol, neopentyl glycol, or diethylene glycol; and 0 to 90 mole percent of one or more residues of: ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenyl A, or polyalkylene glycol. The 1,4-cyclohexanedimethanol ("CHDM") and 1,4-cyclohexanedicarboxylic acid ("CHDA") may be used as the pure cis, trans or mixtures of cis/trans isomers. Any of the naphthalenedicarboxylic acid isomers may be used but the 1,4-, 1,5-, 2,6-, and 2,7-isomers or mixtures of these isomers are preferred. Examples of polyalkylene glycols include polytetramethylene glycol (PTMG) and polyethylene glycol (PEG) having molecular weights up to about 2,000. In another example, the diol residues may comprise about 10 to about 99 mole percent of residues of 1,4-cyclohexanedimethanol, 0 to about 90 mole percent of residues of ethylene glycol, and about 1 to about 25 mole percent of residues of diethylene glycol. In yet another example, the diacid residues may comprise at least 95 mole percent of the residues of terephthalic acid and the diol residues may comprise about 10 to about 40 mole percent of the residues of 1,4-cyclohexanedimethanol, about 1 to about 25 mole percent of the residues of diethylene glycol, and about 35 to about 89 mole percent of the residues of ethylene glycol.

The diacid residues further comprise 0 to about 20 mole percent of one or more residues of a modifying diacid containing 4 to 40 carbon atoms if desired. For example, from 0 to about 30 mole % of other aromatic dicarboxylic acids containing 8 to about 16 carbon atoms, cycloaliphatic dicarboxylic acids containing 8 to about 16 carbon atoms, aliphatic dicarboxylic acids containing about 2 to about 16 carbon atoms or mixtures thereof may be used. Examples of modifying carboxylic acids include, but are not limited to, one or more of succinic acid, glutaric acid, 1,3-cyclohexanedicarboxylic, adipic acid, suberic acid, sebacic acid, azelaic acid, dimer acid, or sulfoisophthalic acid. It is understood by persons skilled in the art that the final composition can be arrived at by blending various resins or by direct reactor copolymerization. The latter is desirable to minimize compositional variability but economic necessities often make blending more cost effective.

Other examples of polyesters that may comprise the continuous polyester phase are those based on poly(ethylene terephthalate) containing about 15 to about 55 mole percent of 1,3-or 1,4-cyclohexanedimethanol, and from 1 to about 25 mole % of diethylene glycol and poly(ethylene terephthalate) containing about 15 to about 35 mole % of 1,3or 1,4-cyclohexanedimethanol, and about 5 to about 15 mole % of diethylene glycol. Additionally, from 0 to about 5% of other dicarboxylic acids or other modifying glycols as set forth above may be used if desired.

The polyesters generally will have inherent viscosity (I.V.) values in the range of about 0.5 dL/g to about 1.4 dL/g. Additional examples of I.V. ranges include about 0.65 dL/g to about 1.0 dL/g and about 0.65 dL/g to about 0.85 dL/g.

The polyesters of the instant invention are readily prepared from the appropriate dicarboxylic acids, esters, anhydrides, or salts, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters of the present invention are prepared by procedures known to persons skilled in the art. The reaction of the diol and dicarboxylic acid may be carried out using conventional polyester polymerization conditions or by melt phase processes, but those with sufficient crystallinity may be made by melt phase followed by solid phase polycondensation techniques. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

In addition, the polyester may further comprise one or more of the following: antioxidants, melt strength enhancers, branching agents (e.g., glycerol, trimellitic acid and anhydride), chain extenders, flame retardants, fillers, acid scavengers, dyes, colorants, pigments, antiblocking agents, flow enhancers, impact modifiers, antistatic agents, processing aids, mold release additives, plasticizers, slips, stabilizers, waxes, UV absorbers, optical brighteners, lubricants, pinning additives, foaming agents, antistats, nucleators, glass beads, metal spheres, ceramic beads, carbon black, crosslinked polystyrene beads, and the like. Colorants, sometimes referred to as toners, may be added to impart a desired neutral hue and/or brightness to the polyester and the calendered product. Preferably, the polyester compositions may comprise 0 to about 30 weight percent of one or more processing aids to alter the surface properties of the composition and/or to enhance flow. Representative examples of processing aids include calcium carbonate, talc, clay, mica, zeolites, wollastonite, kaolin, diatomaceous earth, $TiO_2$, $NH_4Cl$, silica, calcium oxide, sodium sulfate, and calcium phosphate. Use of titanium dioxide and other pigments or dyes, might be included, for example, to control whiteness of the film, or to make a colored film. An antistat or other coating may also be applied to one or both sides of the film. Corona and/or flame treatment is also an option although not typically necessary due to the high surface tension of the void-containing films. For certain combinations of polymers it may also be necessary to add acid scavengers and stabilizers to prevent degradation/browning of the cellulose esters.

The shrink film comprises a voiding agent that comprises a first and second polymer which may be selected from a wide range of polymers. The first polymer may be a single polymer or blend of one or more polymers. For example, the first polymer may comprise one or more polymers selected from cellulosic polymers, starch, esterified starch, polyketones, polyester, polyamides, polysulfones, polyimides, polycarbonates, fluoropolymers, polyacetals, olefinic polymers, and copolymers of these polymers with other monomers such as, for example, copolymers of ethylene with acrylic acid and its esters.

Cellulosic polymers are efficient voiding agents because of their high glass transition temperature and good surface tension match with many typical polymer matrices. Thus, in one example, the first polymer of our novel voiding agent may a cellulosic polymer and may comprise one or more of microcrystalline cellulose, a cellulose ester, or a cellulose ether. In another embodiment, the first polymer may be a cellulose ester such as, for example, cellulose acetate, cellulose triacetate, cellulose acetate propionate, or cellulose acetate butyrate. In yet another example, the first polymer may be a cellulose ether which may include, but is not limited to one or more of: hydroxypropyl cellulose, methyl ethyl cellulose, or carboxymethyl cellulose.

The second polymer may comprise one or more polymers selected from polyamides, polyketones, polysulfones, polyesters, fluoropolymers, polyacetals, polycarbonates, olefinic polymers, and copolymers thereof. For example, the second polymer may include, but is not limited to, one or more olefinic polymers such as, for example, polyethylene, polystyrene, polypropylene, and copolymers thereof. Further nonlimiting examples olefinic copolymers include ethylene vinyl acetate, ethylene vinyl alcohol copolymer, ethylene methyl acrylate copolymer, ethylene butyl acrylate copolymer, ethylene acrylic acid copolymer, or ionomer. In one example, the first polymer comprises one or more of cellulose acetate or cellulose acetate propionate and the second polymer comprises one or more of: polystyrene, polypropylene, or ethylene methyl acrylate copolymer.

Typically, the voiding agent comprises about 5 to about 95 weight percent of the first polymer, based on the total weight of the voiding agent. Other ranges for the first polymer within the voiding agent are about 40 to about 60 weight percent and about 50 to about 60 weight percent. When the first polymer is a cellulosic, one benefit of the presence of the second polymer, among other things, is to improve the processibilty and dispersion of the first polymer. For example, cellulosic polymer powders can be difficult to compound directly using a single screw extruder because of difficulties in handling or feeding. In addition, the high moisture uptake of the cellulosic can lead to unacceptable hydrolysis and moisture volatilization in a polyester matrix. Thus, unless already prepelletized, the cellulosic typically requires the use of a twin-screw, calender, or similar system that can adequately mix and vent these powders during its dispersion in the polymer matrix.

As described above, the second polymer may comprise one or more olefinic polymers and copolymers well-known in the art, such as, for example, ethylenes, propylenes, styrenics, vinyls, acrylics, poly(acrylonitrile), and the like. The selection of the olefinic polymer will depend on the desired properties of the shrink film. For example, the addition of styrenics such as, for example, polystyrene, methyl methacrylate butadiene styrene, styrene acrylonitrile, and the like, can help to modify and improve solvent seaming (as they are more easily solubilized by many common solvents), improve opacity, although they also make the film more brittle and can tend to cause off-gassing. Their refractive index is closer to polyesters and their opacifying capacity is lower than cellulosics. By contrast, voiding agents such as, for example, polypropylene are less effective than styrenics, but are softer and more easy to blend with the cellulosics. They also enhance opacity significantly when used in conjunction with the cellulosic because of a greater difference in refractive index although they can affect printing and seaming if used at too high a level.

It is advantageous but not critical that the second polymer has a refractive index that differs from the refractive index the polyester by an absolute value of at least 0.02. For example, polyesters typically have a refractive index of around 1.57, thus polyethylene and polypropylene, with a refractive index of around 1.50, and polystyrene, with a refractive index of around 1.59 may be selected as the second polymer of the voiding agent because the difference in their refractive indices from that of the polyester is greater than 0.02. This difference in refractive indices enhances the opacity of the shrink film. It is also possible to increase opacity by adding inorganic fillers or pigments such as, for example, $TiO_2$, carbon black, and the like; however, the addition of inorganic materials often will increase the density of the final film and are less desirable. For the present invention, the opacity of the film is high enough that these inorganic fillers are not required. For example, the films, sheet, and shaped articles of the present invention typically have an absorptivity of about 200 $cm^{-1}$ or higher. Thus, a 2 mil (50 um) film will have a total light transmission of about 35% or less at this absorptivity. Most the transmitted light is diffuse or scattered light. The presence of voids and any additives that may be used in the film also serve to block the transmission of UV light for applications with UV sensitive products. For films made by a blown film process, the combination of cellulosic with olefin also is beneficial in that both typically improve the melt strength of the polyester continuous phase. Higher melt strength improves the control of bubble shapes and stretch conditions during double bubbling.

A certain degree of stiffness is desirable for certain film applications such as, for example, sleeve labels. Some of the olefins such as, for example, EMAC, provide a more flexible film and have a "soft touch" that may be useful where sleeving is not as critical (e.g. roll-fed labels). This soft touch also may improve the compatibility of the film with other olefins to make the label more conducive to gluing with ethylene(vinyl acetate)-based hot melt adhesives or for heat sealing. It may be useful, therefore, to combine softer and harder olefins to balance the properties of the shrink film such as, for example, softness and stiffness.

We have found that olefinic copolymers such as, for example, ethylene methyl acrylate copolymer (abbreviated herein as "EMAC"), ethylene butyl acrylate (abbreviated herein as "EBAC"), ethylene acrylic acid (abbreviated herein as "EAA") copolymer, maleated, oxidized or carbyoxylated PE, and ionomers may be used advantageously with the cellulosic polymers described above as the second polymer to increase the opacity and improve the overall aesthetics and feel of the film. These olefins also may aid the compounding and dispersion of the cellulosic. Thus, for example, the second polymer may comprise one or more of EMAC or EBAC.

In another embodiment, the first polymer may comprise one or more of cellulose acetate or cellulose acetate propionate and the second polymer may comprise one or more of polystyrene, polypropylene, or ethylene methyl methacrylate copolymer. Although not critical, a second polymer having Tg or a Tm greater than the Tg of the polyester continuous phase may help to improve the voiding efficiency of the voiding agent. The inclusion of a third polymer component in addition to a first and second polymer, in some instances, has been found to increase opacity and, in particular, enhance the dispersion of the first and second polymer components within the continuous polyester phase. Thus, our novel composition further may include a third polymer dispersed within the continuous polyester phase having a surface tension that is between the surface tension of the continuous polyester phase and the second polymer, and a density of 1.1 g/cc or less. A difference in refractive index between the third polymer and the continuous polyester phase by an absolute value of at least 0.04, as discussed above for the first and second polymer components, is desirable to achieve good opacity for the composition. To enable good dispersion and mixing of the first, second, and third polymer components with the continuous polyester phase, it is advantageous for the third polymer to have a surface tension that is between the surface tension of the polymer matrix and that of the second polymer. It is also desirable that the density of the third polymer is about 1.1 g/cc or less to reduce the overall density of the composition.

When the voiding agent comprises a cellulosic polymer and an olefinic polymer, the voiding agent typically will comprise at least 5 weight percent or more of the cellulosic polymer, based on the total weight of the composition. Preferably, the voiding agent will comprise at least 30 weight percent of the cellulosic polymer. The components of the voiding agent can compounded together on a mixing device such as, for example, a twin screw extruder, planetary mixer, or Banbury mixer, or the components can be added separately during film formation. Small amounts of inorganic voiding agents can also be included. It may be desirable to precompound the cellulosic polymer and the olefin, in which the olefin may be used as part of the carrier resin in which the cellulosic is dispersed. Precompounding the olefin and the cellulosic polymer provides the added advantage that the olefin serves as a vehicle for dispersing the cellulosic polymer, and provides an efficient moisture barrier to prevent uptake of moisture prior into the cellulosic polymer to final extrusion. In addition, the voiding agent is easier to handle and dry. It is also possible to use blends of polymers as voiding agents as long as sufficient shearing, for example, by the use of a twin screw or high shear single screw extruder, is used to adequately disperse the components of the voiding agent.

The void-containing, shrink film of the present invention may comprise a single layer or may be incorporated as one or more layers of a multilayered structure such as, for example, a laminate used in a roll-fed label. Typically, the density of film is about 1.2 grams/cubic centimeter (abbreviated herein as "g/cc") or less. Examples of densities of the void-containing film of the present invention are about 1.20 g/cc or less, about 1.1 g/cc or less, about 1.0 g/cc or less, about 0.9 g/cc or less, about 0.8 g/cc or less, about 0.7 g/cc or less, and about 0.6 g/cc or less. For some applications, for example, recycleable shrink labels, the density of the film preferably is about 1.0 g/cc or less, more preferably about 0.90 g/cc or less, in order to achieve true flotation during recycle and flake washing in a water bath. The final density of the film is a function of the level and density of the filler, the degree of voiding, the stretch ratio, and the stretch temperature, and may be tailored as appropriate, for example, to improve the separation of the film from the various other polymer components present within the packaging materials.

The void-containing shrink film of this invention is typically prepared by methods well-known to persons skilled in the art such as, for example, extrusion, calendering, casting, drafting, tentering, or blowing. These methods initially create an unoriented or "cast" film that is subsequently stretched in at least one direction to impart orientation and to create the voids. In generally, stretch ratios of about 3× to about 8× are imparted in one or more directions to create uniaxially or biaxially oriented films. More typically, stretch ratios are from 4× to about 6×. The stretching can be performed, for example, using a double-bubble blown film tower, a tenter frame, or a machine direction drafter. Stretching is preferably performed at or near the glass transition temperature (Tg) of the polymer. For polyesters, for example, this range is typically Tg+5° C. (Tg+10° F.) to about Tg+33° C. (Tg+60° F.), although the range may vary slightly depending on additives. A lower stretch temperature will impart more orientation and voiding with less relaxation (and hence more shrinkage), but may increase film tearing. To balance these effects, an optimum temperature in the mid-range is often chosen. Typically, a stretch ratio of 4.5 to 5.5× may be used to optimize the shrinkage performance and improve gauge uniformity.

For the present invention, the film typically has a shrinkage along the principal axis of at least 5% at about 70° C. (167° F.) and at least 30% at about 95° C. (200° F. Shrinkage is measured by immersing a premeasured piece of film into a water bath for 10 seconds. The term "shrinkage", as used herein, is defined as the change in length divided by the original length (times 100%). In another example, the shrinkage is at least 10% at 70° C. (167° F.) and at least 40% at 95° C. In yet another example, the shrinkage is 15% or more at 70° C. and 50% or more at 95° C. Greater amounts of shrinkage may be desirable for commercial applications such as, for example, shrink labels, as the fitting of the label over more highly contoured bottles may be improved.

It is understood that the present invention also encompasses various modifications to control and improve shrink properties as well known to those skilled in the art. For example, to improve shrinkage at lower temperatures, a polyester or polyester monomer, or alternate polymer with a low softening point (e.g., DEG or butanediol) may be incorporated to lower the overall Tg of the polymer film. Soft segments based on polytetramethylene glycol, PEG, and similar monomers, may be added to flatten the shrink curve, lower the shrink onset, control the rate of shrinkage or improve tear properties. The shrink properties are dependent on the stretching conditions which may be modifed as appropriate to provide variations in properties such as, for example, controlled shrink force, shrink force ratios in each direction, controlled shrinkage, and property retention after shrinkage. The various factors that control the shrinkage properties of polyester films are discussed extensively in several journal articles such as, for example, in Shih, *Polym. Eng. Sci.*, 34, 1121 (1994).

The void-containing shrink film of our invention may comprise polyesters of various compositions. For example, one embodiment of the present invention is a void-containing, shrink film comprising an oriented, continuous polyester phase comprising (i) diacid residues comprising at least 80 mole percent, based on the total moles of diacid residues, of one or more residues of terephthalic acid or isophthalic acid; and (ii) diol residues comprising 15 to 55 mole percent, based on the total moles of diol residues, of one or more residues of 1,4-cyclohexanedimethanol or diethylene glycol; and 45 to 85 mole percent of ethylene glycol, having dispersed therein a voiding agent comprising at least one first polymer, and at least one second polymer, wherein the first polymer comprises one or more of microcrystalline cellulose, a cellulose ester, or a cellulose ether, has a Tg or a Tm greater than the Tg of the polyester and a surface tension that differs from the surface tension of the polyester by an absolute value of 5 dynes/cm or less; and the second polymer comprises one or more polymers selected from the group consisting of polyethylene, polystyrene, polypropylene, and copolymers thereof, has a surface tension that differs from the surface tension of the polyester by an absolute value of at least 5 dynes/cm, and a melt viscosity wherein the ratio of melt viscosity of the second polymer to the melt viscosity of the polyester is about 0.1 to about 3.5. The first polymer may comprise one or more of cellulose acetate or cellulose acetate propionate and the second polymer may comprise one or more of: polystyrene, polypropylene, or ethylene methyl acrylate copolymer. In a further example, the diacid residues may comprise at least 95 mole percent of the residues of terephthalic acid; the diol residues comprise about 10 to about 40 mole percent of the residues of 1,4-cyclohexanedimethanol, about 1 to about 25 mole percent of the residues of diethylene glycol, and about 35 to about 89 mole percent of the residues of ethylene glycol; the first polymer comprises cellulose acetate; and the second polymer comprises polypropylene and ethylene methyl acrylate copolymer.

As described previously, the film of the present invention may be produced by extrusion, calendering, casting, drafting, tentering, or blowing. The film may be stretched in at least one direction and has a shrinkage along the principal axis at least 10% after 10 seconds in a water bath at 70° C. and at least 40% after 10 seconds in a water bath at 95° C. If the film is stretched in one direction, it may have a low shrinkage in the direction perpendicular to the principal axis or main shrinkage direction. For example, the film may be stretched in one direction and have a shrinkage in a direction perpendicular to the principal axis of 10% or less after 10 seconds in a water bath over a temperature range of 70° C. to 95° C. After orientation and void formation, the film will typically have a lower density and a higher optical absorptivity than the non-oriented film. Examples of densities that may be exhibited by the void-containing film of the invention are about 1.20 g/cc or less, about 1.1 g/cc or less, about 1.0 g/cc or less, about 0.9 g/cc or less, about 0.8 g/cc or less, about 0.7 g/cc or less, and about 0.6 g/cc or less. In addition, the void-containing shrink film will have typically have an absorptivity of about 200 $cm^{-1}$ or greater.

Sleeves and labels may be prepared from the void-containing shrink film of the present invention according to methods well known in the art. These sleeves and labels are useful for packaging applications such as, for example, labels for plastic bottles comprising poly(ethylene terephthalate). Our invention, therefore, provides a sleeve or roll-fed label comprising the void-containing shrink films described hereinabove. These sleeves and labels may be conveniently seamed by methods well-known in the art such as, for example, by solvent bonding, hot-melt glue, UV-curable adhesive, radio frequency sealing, heat sealing, or ultrasonic bonding. For traditional shrink sleeves involving transverse oriented film (via tentering or double bubble), the label is first printed and then seamed along one edge to make a tube. Solvent seaming can be performed using any of a number of solvents or solvent combinations known in the art such as, for example, THF, dioxylane, acetone, cyclohexanone, methylene chloride, n-methylpyrrilidone, and MEK. These solvents have solubility parameters close to that of the film and serve to dissolve the film sufficiently for welding. Other methods such as RF sealing, adhesive gluing, UV curable adhesives, and ultrasonic bonding can also be applied. The resulting seamed tube is then cut and applied over the bottle prior to shrinking in a steam, infrared or hot air type tunnel. During the application of the sleeve with certain types of sleeving equipment, it is important that the film have enough stiffness to pass over the bottle without crushing or collapsing as the sleeve tends to stick to or "grab" against the side of the bottle because of friction. The void-containing sleeves of the present invention have a coefficient of friction (COF) that typically is about 20 to 30% lower than that of the unvoided film. This lower COF helps to prevent label hanging and make sleeve application easier and is an unexpected benefit of the present invention.

For roll-fed labels, the void-containing film is traditionally oriented in the machine direction using, for example, a drafter. These labels are wrapped around the bottle and typically glued in place online. As production line speeds increase, however, faster seaming methods are needed, and UV curable, RF sealable, and hot melt adhesives are becoming more preferred over solvent seaming. For example, a hot melt polyester might be useful to seam a polyester-based void-containing film.

Our invention also provides a process for a void-containing shrink film, comprising: (i) mixing a polyester and a voiding agent at a temperature at or above the Tg of the polyester to form a uniform dispersion of the voiding agent within the polyester, wherein the voiding agent comprises at least one first polymer and at least one second polymer, wherein the first polymer has a Tg or a Tm greater than the Tg of the polyester, and a surface tension that differs from the surface tension of the polymer matrix by an absolute value of 5 dynes/cm or less; the second polymer has a surface tension that differs from the surface tension of the polyester by an absolute value of at least 5 dynes/cm and a melt viscosity wherein the ratio of melt viscosity of the second polymer to the melt viscosity of the polyester is about 0.1 to about 3.5; (ii) forming a sheet or film; (iii) orienting the sheet or film in one or more directions; and (iv) optionally, heatsetting the film of step (iii). Further, our invention provides a film or sheet prepared by the above process. The various embodiments of the voiding agent and the polyester are as described previously.

The formation of the sheet or film may be carried by any method known to persons having ordinary skill in the art such as, for example, by extrusion, calendering, casting, or blowing. The voiding agent and the polyester may be dry blended or melt mixed at a temperature at or above the Tg of the polyester in a single or twin screw extruder, roll mill or in a Banbury Mixer to form a uniform dispersion of the voiding agent in the polyester. In a typical procedure for preparing film such as, for example, using a voiding agent comprising a cellulosic polymer and an olefin, and a polyester as the polymer matrix, the melt is extruded through a slotted die using melt temperatures in the range of about 200° C. (400° F.) to about 280° C. (540° F.) and cast onto a chill roll maintained at about −1° C. (30° F.) to about 82° C. (180° F.). The film or sheet thus formed wil generally have a thickness of about 5 to about 50 mils, although a more typical range is 5 to 15 mils. The film or sheet is then uniaxally or biaxially stretched in amounts ranging from about 200 to about 700% to provide an oriented film having a thickness of about 1 to about 10 mils, more typically about 1 to about 3 mils. Higher final thicknesses might be desirable, for example, to take advantage of the insulative properties or cushioning properties of the void-containing film. The voids created during the stretching operation can act as insulators much like the pores of a foamed film. Thus, the thickness of the film can be increased as appropriate to achieve the desired level of insulation. It is also possible to combine void-containing layers with foamed layers in a layered or laminated structure. For example, a foamed center layer can be encapsulated by two void-containing layers to maximize density reduction and improve printing performance.

The stretching processes may be done in line or in subsequent operations. For the shrink film of the present invention, the film typically is not heatset significantly to provide maximum shrinkage. Subsequently, the void-containing film may be printed and used, for example, as labels on beverage or food containers. Because of the presence of voids, the density of the film is reduced and the effective surface tension of the film is incresased giving it a more paper-like texture. Accordingly, the film will readily accept most printing inks and, hence, may be considered a "synthetic paper". Our shrink film may also be used as part of a multilayer or coextruded film, or as a component of a laminated article.

Post-stretch annealing or heatsetting is also advantageous for maintaining low density and reducing shrink force. Normally annealing is carried out in the heatset zone of the tenter frame but at much lower temperatures than with traditional heatsetting. The film is constrained while being heated to an annealing temperature close to Tg of the film. Optionally, the tenter clips can be brought together slightly (e.g. from about 1 to about 10%) to facilitate the process and to help relax the film slightly, which better establishes the voids and reduces shrink stresses. High shrink stresses may cause the film to shrink prematurely and may close some of the voids thereby offsetting any density reduction. Annealing times and temperatures will vary from machine to machine and with each formulation, but typically will range from about Tg−20° C. to about Tg+20° C. for about 1 to about 15 seconds. Higher temperatures usually require shorter annealing times and are preferred for higher line speeds. Additional stretching after annealing can be performed, although not required. The annealing process typically will reduce the maximum shrinkage slightly (e.g. a few percent); however reduction is sometimes useful to maintain the void cells and to maintain the dimensions of the film.

Through variations in the level of voiding agent and stretch conditions, composition and process parameters, the the void-containing polyester compositions, shaped articles, and shrink film of the instant invention may be prepared in a range of densities that may advantageously tailored for the separation of the void-containing polyester from other polymers for recovery and recycling. Another aspect of our invention, therefore, is a process for separating a void-containing polyester from a mixture of different polymers, comprising:
(i) shredding, chopping, or grinding a mixture of polymers comprising the void-containing polyester and at least one other polymer to produce particles of the mixture;
(ii) dispersing the mixture into an aqueous or gaseous medium;
(iii) allowing the particles to partition into a higher density fraction and a lower density fraction; and
(iv) separating the lower density fraction from the higher density fraction;

wherein the void-containing polyester comprises a continuous polyester phase having dispersed therein a voiding agent comprising at least one first polymer and at least one second polymer, wherein the first polymer has a Tg or a Tm greater than the Tg of the polyester, and a surface tension that differs from the surface tension of the polyester by an absolute value of 5 dynes/cm or less; and the second polymer has a surface tension that differs from the surface tension of the polyester by an absolute value of at least 5 dynes/cm, and a melt viscosity wherein the ratio of melt viscosity of the second polymer to the melt viscosity of the polyester is about 0.1 to about 3.5. Our process is understood to include the various additional embodiments of the voiding agent and the polyester as described previously.

In addition to the void-containing polyester, the mixture of polymers may include, but is not limited to, one or more polymers commonly used in commercial packaging applications such as, for example, poly(ethylene terephthalate), poly(vinyl chloride), polypropylene, polycarbonate, poly (butylene terephthalate), polystyrene, or polyethylene. The mixture of polymers containing the void-containing polyester is shredded, chopped, or ground to produce particles of the mixture, for example, in the form of flakes. The particles are then dispersed into a gaseous or aqueous medium such as, for example, air (e.g., air elutriation) or water. The mixture is then allowed to partition into a higher density fraction and a lower density fraction which are then separated. Because of the diffence in density between the void-containing polyester and the other polymers in the mixture, the void-containing polyester will comprise substantially either the lower density layer or the higher density layer, depending on the density of the remaining polymers in the mixture. For example, the polymer mixture may comprise low density polymers such as, for example, polyethylene or polypropylene wherein the higher density fraction will comprise substantially the void-containing polyester. For example, the void-containing shrink film could be used to produce a label for a polyethylene bottle in which it is desirable that the label have a density of about 1.0 g/cc or higher after shrinkage. With this density, the void-containing label would sink in a aqueous flotation tank and, thus, enable separation from the lower density, floating polyethylene polymer. In another example, the polymer mixture may comprise higher density polymers such as, for example, poly(ethylene terephthalate) or poly(vinyl chloride), wherein the lower density fraction will comprise substantially the void-containing polyester. For example, the void-containing shrink film could be used to produce a label for a PET bottle. The void-containing label would preferably have a density of less than 1.0 g/cc after shrinkage, thus permitting it to float in a separation tank. The PET flake, having a density greater than 1.0, would sink and, therefore, could be easily separated and collected. Thus, the optimal density range for the microvoided films depends on the type of package material to which it is applied.

Our process may be illustrated and described further with particular reference to the separation of void-containing polyester shrink labels from poly(ethylene terephthalate) obtained from bottles or packaging materials. The recycled bottles and labels typically are first ground and passed through an air elutriation step. Air is blown up through the flakes and labels, which forces the lighter density materials up and out of the tank. This step removes a substantial portion of the label. The remainining polymer mixture is then washed in a caustic solution at a temperature of about 85° C. The void-containing shrink labels having a density less than 1 g/cc (the approximate density of the bath), float to the top and are skimmed off. The poly(ethylene terephthalate) bottle flake, which has a density greater than 1 g/cc, drops to the bottom of the tank where it may be separated and/or recycled. Similarly, the label and the bottle flake may be partitioned into a high density fraction and a low density fraction by air elutriation and subsequently separated. For polymer mixtures containing lower density polymers such as, for example, high-density polyethylene or polypropylene, the recycle process is reversed. In these examples, polymer mixture will comprise substantially the lower density fraction and the void-containing polyester will comprise substantially the higher density fraction. For example, if water is used to disperse the mixture of polymer particles, the void-containing film advantageously should have a density greater than 1.0 g/cc in the wash bath.

The density of the void-containing polyester films may vary as a result of shrinkage and, thus, should be taken into account for the separation process of the invention. Typically, the density increases by ca. 0.05 g/cc after shrinkage. Furthermore, if the film is printed, the inks and any overcoat may add to the effective density. Thus, the combined effects of these variables may require that the starting density be preferably be about 0.90 g/cc or lower in order to ensure good flotation after shrinkage. It is possible to control this amount of density reduction during shrinkage by proper annealing. With greater post-stretch annealing, the voids become more stabilized but with lower maximum shrinkage.

The following examples will further illustrate the invention.

EXAMPLES

General—Test methods followed standard ASTM procedures wherever possible. Because of the small size of some of the samples stretched on the T.M. Long film stretcher, however, some minor modifications to the ASTM procedures were required.

Density measurements were performed using a gradient column made from ethanol and water. The density range of the column was nominally 0.82 to 1.00 g/cc. In the case of tentered film where the quantity of film was sufficient, density also was measured by cutting out and weighing 10 sheets, 10×10 cm in area, measuring the thickness of the sheets at multiple points across the sheets, and averaging the measurements. The average density was then calculated from the mass divided by the volume.

General film quality and aesthetics were based on subjective evaluation and are shown in Table II. An excellent film was one with uniform dispersion of voids/additives, high opacity, no high/low spots, and no streaking from poor mixing. Film tactile qualities (i.e. "hand") were also included with stiff, noisy films being rated more poorly, and softer "low-noise" films being preferred. Poor films generally exhibited a combination of high noise and poor surface/opacity uniformity (e.g. "streakiness").

Tensile properties were measured by ASTM Method D-638 to allow for small sample dimensions of the T.M. Long stretched film. Some testing also was performed using the more common ASTM Method D882 where longer gauge lengths were available. All modulus data were obtained at room temperature and refer to the nominal, unoriented state of the material unless otherwise noted. Some of the modulus data in Table I was also obtained from the general product literature.

Total light transmittance was measured by ASTM Method D1003. In addition, absorptivity was determined as a way to normalize the effects of thickness variation on the transmittance and to provide a truer measure of opacity. The absorptivity (units of 1/cm) is based on Beer's Law and is calculated as Absorptivity=−ln(internal transmittance)/thickness where ln is the natural log (base e), thickness refers to the film thickness (in cm) and internal transmittance is the transmittance corrected for surface reflective losses. For a clear, nonvoided polyester film, there is typically 4% reflective loss on the front surface and 4% on the back surface because of refractive index mismatch between film and air. For the opaque, void-containing films there is typically only the 4% reflected loss on the front surface as insufficient light penetrates the film to reach the back surface.

Film shrinkage was measured by immersing a sample of known initial length into a water bath at a given temperature from 65° C. to 95° C. for either 5, 10, or 30 seconds, and then measuring the change in length in each direction. Shrinkage is reported as change in length divided by original length times 100%. The shrinkage at 95° C. after 10 s is reported as the "ultimate" shrinkage. Nominal sample size was 10 cm by 10 cm although for the T.M. Long stretched films, the off-axis width was reduced.

Shrink force was measured on a ½ inch wide strip of film, mounted in a tensile rig with a force transducer. Gauge length between grips was 2 inches. The sample was rapidly heated with a hot air gun and the maximum force registered on the force transducer. Although shrink force can be reported directly in units of pounds or Newtons, shrink stress is more common and was obtained by dividing the force by the intial cross-sectional area.

Surface energy, sometimes referred to "critical surface tension", was measured using Accudyne™ dyne marker pens or obtained from the literature (*Polymer Handbook* by J. Brandrup, and E. H. Immergut, $3^{rd}$ Ed. John Wiley and Sons, pages 411–426 (1989), and Properties of Polymers, by D. W. Van Krevelin, Elsevier, Amsterdam, (1990)) and are given in Table I, in addition to the refractive indices for various polymers. Values are shown for amorphous versions of polymers where possible.

Surface tension may vary with crystallinity and orientation (e.g. surface tension decreases for polyesters like PET and PBT when crystallized). During melt blending, the polymers are in their amorphous state; thus, the unoriented, non-crystalline surface tension values are reported in Table I wherever possible. For crystalline particles that do not completely melt during mixing, however, the crystalline value was deemed more appropriate and should be used instead. Critical surface tension measured by this method is approximately the same as the total surface tension measured by other methods; however, when the values were different, reference was made to the critical surface tension for consistency with the data.

The coefficient of friction (COF) was measured using ASTM Method D1894 for the film against itself. Melt viscosity was measured using a parallel plate rheometer with a nitrogen atmosphere in dynamic mode. The viscosity at 1 rad/s (equivalent to 1 s$^{-1}$ shear rate) was taken as the nominal zero shear viscosity and used for the calculations in the examples because the polymers of interest were typically Newtonian over a broad shear range (including that seen in the extruder). Refractive index was measured using a Metricon™ prism coupler with a 633 nm wavelength laser or obtained from the literature. The refractive index was calculated as the average value of all three directions for oriented materials. Nominally the refractive index should be measured based on the form of the material in the final film (i.e. crystalline or amorphous).

Melting points and glass transition temperatures were determined by either DSC (using ASTM Method D3418), dynamic mechanical analysis (16 rad/s freq) or obtained from product and general literature. The property data for the compositions of the examples are given in Table II and the data for the oriented films are given in Table III. Table IV provides modulus and density data for some of the films of the examples.

Comparative Examples 1–3

Comparison of Cellulosic Versus Olefinic Voiding Efficiency

An amorphous polyester comprising 100 mole percent terephthalic acid, 10 to 40 mole percent 1,4-cyclohexanedimethanol, 35 to 89 mole percent ethylene glycol, and 1 to 25 mole percent diethylene glycol (neat density=1.30 g/cc, refractive index 1.565, surface energy=42 dyne/cm, Tg=75° C.), was combined with various voiding agents using a twin screw extruder. The voiding agents included either cellulose acetate ("CA") powder (CA398-30, available from Eastman Chemical Co.), polypropylene (P4G3Z-039, available from Huntsman Chemical Co., 5 melt index), or linear low density polyethylene ("LLDPE") (HIFOR™ polyethylene available from Eastman Chemical Co., 2 melt index) and are shown in Tables II and III. The CA had a refractive index (RI) of 1.473, a surface tension of 44 dyne/cm, and glass transition temperature of about 185° C. The polypropylene had a refractive index of 1.490, a surface tension of 30 dyne/cm, and a melting point of 160° C.; and the polyethylene had a refractive index of 1.49, a surface tension of 32 dyne/cm, and a melting point of 120° C. The cellulosic was within 5 dyne/cm or less of the polyester surface tension whereas the olefins were not, thus the latter were classified as "the second polymer" in Table II.

The compounded products were pelletized for ease of handling, and then combined with the neat copolyester in a 50/50 ratio resulting in a 10% final loading of voiding agent. All samples were dried at 54.4° C. (130° F.) for 8 hours prior to extrusion. This second blending was performed on a 2.5 inch single screw extruder (L/D=30:1) equipped with a film die at a nominal melt temperature of 260° C. Viscosities of the resins at this temperature are as follows: polyester: 11000 poise; PP:6500 poise; LLDPE: 17400 poise. Film was cast from this blend having a final thickness of 10 mils. The two olefinic concentrates also contained 1 weight percent of Eastman ethylene methyl acrylate copolymer (EMAC 2260, available from Eastman Chemical Co.) as a compatibilizer, based on total film weight.

Stretching of the cast film was performed on a commercial tenter frame (Marshall and Williams Co, Providence, R.I.). The stretching conditions varied from material to material, but linespeeds were nominally 15 to 35 feet per minute ("fpm"). The annealing section of the tenter was set at 70° C. with the clips retracted about 5% to help reduce shrinkage force for all samples.

For the PP voiding agent (Comparative Example 2), densities of 1.12 to 1.15 g/cc were achieved by stretching the film 5.2× at 80° C. (ca. 180° F.). Resulting films had 36% shrinkage at 75° C. (167° F.) and 70% at 95° C. Total transmittance was 82% because of poor voiding efficiency.

For the LLDPE voiding agent (Comparative Example 3), a density of only 1.19 g/cc was obtained even after stretching 6× at 85° C. at 15 fpm linespeed. Film shrinkage was 21% at 75° C. and 70% at 95° C. The softer nature of LLDPE made it much less effective than PP, even though the stretch ratio was higher. Transmittance was 89%.

For the CA voiding agent (Comparative Example 1), densities of 1.03 to 1.05 g/cc were achieved using the same 5.2× stretch ratio as for PP, and a stretch temperature of 85° C. Increasing the stretch ratio up to 6.4× at 85° C. (185° F.) resulted in specific gravities of 0.99 g/cc. Film shrinkages at 5.2× were 23% at 75° C. and 72% at 95° C. (200° F.). Transmittance was only 27%, which was much more opaque than the PP or LDPE voiding agents.

The CA films were significantly better in appearance than either of the olefin based films, having a smoother, more uniform matte finish and much greater opacity (as seen with the transmittance values) because of the better dispersion (i.e. surface tension matched with matrix resin). Both olefin films were translucent by comparison and exhibited significant "contact clarity" which would not be of benefit for most packaging.

Although all of the films used the same weight percent of voiding agent, the CA based films had a significantly lower density and higher surface tension. This is true even though the olefins, which are inherently lower in density (ca. 0.90 g/cc for each) should have a greater concentration of voiding agent on a volumetric basis. Thus, the CA was clearly more efficient and better dispersed.

Comparative Examples 4—5

Commercial Drafting of Microvoiding Agents

In this example, a commercial machine direction ("MD") drafting unit (Marshall and Williams Company) was used in place of the tenter frame for the stretching to impart machine direction ("MD") orientation as opposed to transverse direction ("TD") orientation. Drafting is used as part of biaxial orientation, or by itself for MD shrink labels (e.g. roll-fed labels). It has the advantage of much higher shear rates than tentering and the effective orientation level for a given stretch ratio is higher. Insufficient film was available for significant testing, although the LLDPE film (Comparative Example 3) was retested using the drafter and shown as Comparative Example 4. It was run at a 6× stretch ratio and a nominal stretch temperature of 82° C. (180° F.) and a density of 1.02 g/cc was achieved. Shrinkage at 95° C. was only 59%. The film was more nearly opaque (transmittance of 39%) than the same composition stretched on the tenter frame, but overall was very streaky and poor in appearance.

Comparative Example 5 consisted of the same polyester as in Comparative Examples 1–3, except that the polyester was blended with 15 weight percent of K-RESIN™ KR05 styrene-butadiene-styrene copolymer ("SBS", available from Phillips Chemical Co.) and 5% Terlux™ 2812 methacrylate-acrylonitrile-butadiene-styrene copolymer ("MABS", available from BASF Corporation), and was stretched on the drafter using the same conditions described above. Pellet/pellet blending of the resins at the extruder was performed as a lower cost alternative to precompounding the additives. The surface tension of the SBS and MABS were estimated to be 34 and 35–36 dyne/cm respectively. The Tg of the SBS and MABS are approximately 90° C. and 100° C. respectively (both very broad transitions due to block structure). The refractive indices of the SBS and MABS were 1.57 and 1.54 respectively. The SBS viscosity was estimated to be approximately 100,000 poise at the nominal processing temperature of 200° C. whereas the polyester was 75,000 poise giving a ratio of 1.3 with respect to the copolyester. The copolyester/styrenic blends had a final density 0.98 g/cc and shrinkage of 33% and 70% at 85° C. and 95° C. respectively. Total transmittance was 32%. Films of higher aesthetic quality (fewer streaks) and stiffer than the LLDPE, but was inferior to the CA film produced previously (even with the greater loading of voiding agents and higher strain rate of the drafter). The film also was more brittle, which was believed to be the result of the surface tension mismatch of the MABS with the copolyester. Although there was insufficient CA resin for a full trial on the drafter, indications were that it would be similar to the tenter frame, having even lower density and better aesthetics than the olefin and styrene based systems due to the higher strain rate and stretch ratio.

Example 1 and Comparative Examples 6 and 7

Comparison of Cellulosic with Cellulosic-EMAC and Cellulosic-EBAC Voiding Agents on T.M. Long Film Stretcher Various polymers were combined using a twin screw extruder and pelletized in a manner similar to Comparative Examples 1–3 above (and using the same matrix copolyester). These concentrates were then blended into the copolyester at a 25 weight percent loading using a single screw extruder (1.5" Killion) and then cast into 10 mil thick film at a nominal 260° C. melt temperature. Example 1 used a concentrate consisting of a 60/40 blend of CA-398-3 cellulose acetate (refractive index RI=1.473, surface tension=44 dyne/cm, Tg=185° C.) and ethylene methyl acrylate copolymer 2260 ("EMAC", available from Eastman Chemical Co., 2 melt index, RI=1.496, surface tension=34 dyne/cm, viscosity=9900 poise, melting point=77° C.). Comparative Sample 6 was a 60/40 blend of CA-398-3 cellulose acetate and ethylene butyl acrylate copolymer ("EBAC", available from Eastman 0.5 melt index, RI=1.495, surface tension=33 dyne/cm, Tm=86° C.). The EBAC has approximately 4× higher viscosity than the EMAC sample because of higher molecular weight. Comparative Example 7 was a 60/40 blend of CA 398-3 and PETG 6763 copolyester (available from Eastman Chemical Co., Tg=80° C.). In this latter example, only the CA is considered part of the "voiding agent" in contrast to the previous two. Similarly, the PETG 6763 is part of the matrix polyester (and is similar in properties to the main copolyester). Comparative Example 8 was similar to Comparative Example 1 except for the differences in stretch method.

Film was stretched uniaxially 5× (5×1 planar stretch ratio) at 85° C. using a T.M. Long laboratory film stretcher. After stretching, film is normally air cooled to freeze in orientation. Densities were all nominally around 1.0 g/cc or slightly greater and could not be resolved on the column. Light absorptivity values for the films with the addition of the EMAC or EBAC were significantly improved as compared with the CA only (Comparative Example 7). The shrink force was reduced by as much as 25% over the CA sample. The EBAC sample quality was not as good as the EMAC, and had less overall opacity as indicated by its lower absorptivity. This example illustrates that the addition of the $2^{nd}$ voiding agent with a substantially different surface tension but within the desired viscosity ratio range (for the EMAC) helped to enhance the opacity, shrink force, and voiding characteristics further.

Examples 2–3

Tentering of Cellulosic/Olefin Blend

The 60/40 concentrate of Eastman CA 398-3 and EMAC (described above) was used to make void-containing film using a tenter frame. The concentrate was blended at 15 and 25 weight percent loadings into the same copolyester as Comparative Examples 1–3 and cast into film on a 2.5 inch extruder. Film was then stretched on the tenter frame described in Comparative Example 1. Stretch ratios were nominally 5.5× at 89° C.

Comparison of Example 2 and Example 3 with Comparative Example 1 (the CA control) shows the effect of the added olefin under similar stretching conditions. As, with Example 3, the olefin was found to increase the absorptivity (or opacity) and soft feel over the CA by itself. Furthermore the shrink force also was greatly reduced (ca. 50% reduction) with no significant loss of ultimate shrinkage. Surface tensions remained high for all films thereby maintaining ease of printing.

Comparative Example 8

Neat Polyester Film

The same amorphous polyester as described above for Comparative Examples 1–3 was stretched as described in Example 1, using a T.M. Long film stretcher. This film had no voiding agents present.

Examples 4–15

Comparison of Various CA/Olefin Voiding Blends on T.M. Long Stretched Film

A number of concentrates were made on a twin screw extruder as described in the previous example, and then added at either a 25 weight percent or 35 weight percent loading into the polyester. Films were extruded on a 1 inch Killion extruder with a 6 inch die at a nominal temperature of 260° C., and stretched using T. M. Long film stretcher; film properties are listed in Tables II, III, and IV. Included in the blending were EMAC (as described above), styrene acrylonitrile copolymer ("SAN"), methacrylic-acrylonitrile-butadiene-styrene copolymer "MABS", atactic polystyrene PS (all available from BASF Corporation, RI=1.59, surface tension=36 dyne/cm, viscosity=3300 poise, Tg=105° C.)

and PP (melt index=5, RI=1.49, surface tension=30 dyne/cm, viscosity=6500 poise) although the MBS and SAN samples are not listed in the Tables because of catalyst interactions with the cellulosic that led to excessive discoloration. The samples containing 35% loading were only stretched 5× instead of the 5.5× used for the 25 weight percent loading of voiding concentrate.

From the table, it is observed that the PS and PP helped improve the density reduction as compared with the EMAC and also significantly improved the opacity (and shrink force) as compared with the CA control (Comparative Example 1 and Example 7). Both have a large surface tension mismatch with polyester and the viscosity ratios were within the desired range, thereby contributing to their excellent performance. PP was better with regards to opacity which is in line with its greater refractive index mismatch with the copolyester. Ultimate shrinkage remained high while shrink force remained low, for all of these blends.

Comparative Example 9

Use of CA/Olefin Blend to Void oPS Film

A 25 weight percent loading of the 60/40 CA/EMAC concentrate as described in Comparative Example 6 was blended in with SBS and crystal styrene (60 weight percent SBS with 40 wt % crystalline polystyrene) to make a void-containing oriented polystyrene ("oPS") film. The RI of the styrene matrix was approximately 1.57 and the surface tension was approximately 36 dyne/cm. The glass transition temperature of the styrenic matrix was 90 to 95° C. Extrusion conditions were colder with the nominal melt temperature around 210° C. and with stretching being performed at a nominal 105° C. The styrene blend viscosity at this temperature was nominally about 50,000 poise; however the CA was solid at this temperature with a viscosity approaching infinity. Thus, the viscosity ratio is much greater than 3.5. No attempts at optimization were made, but the density was reduced from 1.05 g/cc for the neat oPS to below 1.0 with the microvoiding. The quality of the voiding was poor and inferior to previous examples. Samples also were yellow in appearance, possibly as a result of an acid interaction between the SBS catalysts and cellulosic. It is expected that the color problem could be remedied easily with an acid scavenger and/or stabilizer.

Example 16

Cellulose Acetate Propionate

In this example, the cellulose acetate was replaced with cellulose acetate propionate (Eastman CAP 482-20) (surface tension=40 dyne/cm, RI=1.476, Tg (nominal)=120° C.) and films were prepared as described in Comparative Example 1 using a 60/30/10 CAP/PP/EMAC concentrate and the same copolyester as the polymer matrix. CAP was easily melt processed on a single screw extruder and the dispersion was found to be excellent. Although the CAP used in this example was a powder, it is also readily available in pellet form and could be mixed directly at the extruder rather than precompounding on a twin-screw extruder.

Example 17–18

Microvoiding of Nylon and Polycarbonate Films

In order to verify the effectiveness of the voiding agent on a variety of polymer matrixes, additional samples were prepared from nylon MXD-6 6007™ (available from Mitsubishi Gas Chemical, refractive index=1.582, surface tension=42 to 47 dyne/cm, Tg=85° C.) and bisphenyl-A polycarbonate (6=Melt Index, refractive index=1.585, surface tension=45 dyne/cm, Tg=150° C.) as the base resins. Into each sample was blended 25 weight percent of a voiding agent comprising 50 weight percent cellulose acetate, 30 weight percent polypropylene, 10 weight percent EMAC, and 10 weight percent PS using components described previously. Film was extruded using a 1 inch Killion extruder with a 6 inch film die. Nominal extrusion temperature was 280° C. and the film thickness was 10 mils (0.0254 cm). The viscosities of the components at this temperature are as follows: nylon=7300 poise, PC=14000 poise, PP=5200 poise, EMAC=7000 poise, PS=1500 poise. All were well matched for good mixing with nylon, although the viscosity ratio of the polystyrene with respect to polycarbonate was marginal. The Tg of the CA (ca. 180° C.) was above the Tg of the polycarbonate matrix (150° C.) and the Tg of the nylon (85° C.). The surface tensions were within the desired range for all components. The resulting cast film quality for the nylon blends was excellent with the exception of yellowing because of degradation and/or residual catalyst activity. By contrast, the film quality for the PC blend was acceptable, although not as good as for nylon.

Samples of each film were then cut into ½ inch strips (1.3 cm) and mounted on a Chatillon LTCM-6 tensile rig with a nominal 2 inch gauge length between grips. The film was then heated using a hot air gun until soft, and then stretched uniaxially at 15 inches/minute (38 cm/min) to induce voiding. Stretch ratios varied from about 3× to 6× depending on resin and heating uniformity. Voiding was apparent from the whitening of the film during necking. Pieces of the voided film were then cut from the strips and immersed in water. Both floated indicating a density less than 1 g/cc and thereby verifying the effectiveness of the voiding package.

Comparative Example 10

This example was taken from Example 13 of U.S. Pat. No. 4,770,931 and is provided as a comparative example with additional data on melt viscosities. A void-containing blend was made on a 3.2 cm extruder using cellulose acetate, 4.7 melt index polypropylene (PP 4230), and a 0.70 IV PET. Cellulose acetate loading was 20 weight percent, whereas the PP loading was varied at 3%, 5% and 10%. The nominal melt processing temperature was 280° C., and the melt viscosities at this temperature were 4000 poise and 20,000 poise for PET and PP respectively, resulting in a viscosity ratio of approximately 5. This is outside the range for good mixing. Films were stretched and void-containing on a T.M. Long film stretcher. White, opaque, paper-like films were made; however film strength and quality decreased as the level of polypropylene increased.

Comparative Example 11

In this prophetic example, a blend is made using the polyester of Comparative Examples 1–3 as the matrix resin and a mix of polypropylene, polystyrene, and/or polymethylpentene as the voiding agent. A comparison of the surface tensions show that none of the matrix resins are within the acceptable 5 dyne/cm range of the polyester (which is ca. 42–43 dyne/cm). Because of this poor surface tension match, these voiding agents must rely on optimal mixing conditions, such as high shear and proper viscosity ratio, and mixing will not be as efficient due to reagglomeration. As a result, particle size distributions are not as good, the film surface is rough, and require an additional smooth layer on top of the film so it can be printed.

Example 19

Use of Crystalline Polyester as Voiding Agent

In this prophetic example, PET powder is produced both for commercial use, and in the form of "fines" filtered from a reaction. These fines are an undesirable byproduct of the manufacturing process of PET that are removed during filtration. They are highly crystalline and have a high melting temperature (Tm=240° C. up to 280° C.) and are difficult to melt completely during normal processing, thus the values of the crystalline phase are more applicable. Surface tension of the crystalline PET tends to be lower since the particles do not melt significantly (crystalline surface tension estimated at 36 to 40 dyne/cm depending on local degree of melting). The polyester fines and/or powdered PET powder are mixed into a copolyester along with EMAC resin using a twin screw extruder. The extrusion conditions are at 220° C., which is below the melting point of PET to minimize melting. Film can be stretched and void-containing as previously described, but with the PET particles serving as a surface tension matched voiding agent. Other crystalline polymers like PBT may be used in place of the PET particles.

Example 20

Void Size Analysis

Film samples from Comparative Example 1 (copolyester and CA) and Example 3 (copolyester with CA and EMAC) were analyzed using electron microscopy to determine void size and particle size. Comparative Example 1 had an average void size of 1.398 microns, with a standard deviation of 1.30 microns. The largest detectable hole size was 17.6 microns. By contrast, Example 3 had an average hole size of 0.286 microns and a standard deviation of 0.183 microns. The largest detectable hole size was 2.38 microns. Example 3, which contained both the CA and the EMAC, had a finer hole size distribution than the sample with only CA, thereby yielding a better quality film. The particle size of the individual voiding agents was not determined because of the difficulty of separating the voids from particles.

Example 21

Solvent Seaming of Films

The films from Examples 1–15 and Comparative Examples 1–8 were tested for solvent seaming using commercial seaming solvents (Flexcraft 460™ or Flexcraft 331™ (available from Flexcraft Industries) and the results reported in Table III. Films were cut into strips and a small amount of solvent applied to one side using a pipette or swab, followed by application of the $2^{nd}$ strip of film and "rolling" with a wallpaper roller. Films were allowed to sit either 1 minute or for 2.5 hours (long term) after which a pull test was performed (only data for 1 minute test with Flexcraft 460 is shown in Table I). A strong bond strength indicates that the film broke or deformed before the bond did. A medium bond strength indicates some deformation before bond breakage, whereas a poor strength indicates easy bond breakage. Most of the bond strengths were strong after 2.5 hrs (i.e., the film tore or deformed before the bond broke) except for the films containing high levels of PP (Example 15). After 1 minute, most of the films exhibited sufficient bond strength for a typical label application. It is thus evident that any of these labels can be seamed using traditional methods although some tailoring of solvents may be needed based on the components of the film.

Example 22

Coefficient of Friction

A sample of void-containing film (Comparative Example 8) was compared with a neat copolyester shrink film control. The static COF for the neat copolyester was 0.35 whereas the value for Example 3 was 0.24. The void-containing films also had a much slicker feel in agreement with the data.

Examples 23–24

Shrinkage Properties

All of the films described in Table II and III had shrinkage of greater than 5% at 70° C. after 10 seconds. Most were in the range of 15 to 50% shrinkage under these conditions. All had off-axis shrinkage values of less than 10% over the entire temperature range. The onset of shrinkage is primarily a function of the matrix polymer and nominally starts about 5 to 10° C. below the glass transition temperature (for the polyester used in Examples 1–15 and Comparative Examples 1–8, the Tg was 75° C.).

Shrinkage properties were changed considerably by the voiding agents and stretch conditions as is well known in the art. For this example, concentrates were produced by twin-screw extruder as described previously. Example 23 used a concentrate based on 60 wt % CA and 40 wt % EMAC. Example 24 used a concentrate of 60 wt % CA, 20% EMAC, 10 wt % PP and 10 wt % PS. Both concentrates were blended at 25 wt % loading into the polyester described in Comparative Examples 1-3. Surface tensions and viscosity ratios were within the preferred range for both samples. Film was extruded and tentered at a nominal 5× stretch ratio and a stretch temperature of 85° C. For Example 23, the anneal temperature after stretching was approximately 70° C. and the anneal temperature for Example 24 was approximately 80° C. Film shrinkage for each was measured at different temperatures and times.

In Example 23, the shrinkage in the principal direction at 70° C. after 5 and 10 seconds was 33% and 46% respectively. At 80° C., the shrinkages at 5 and 10 seconds were 65 and 68%. Off-axis shrinkage never exceeded 5%. Thus, Example 23 illustrates that a microvoided film can be made with very rapid and high shrinkage. This type of film is useful in, for example, steam-type shrink tunnels where very precise temperature control allow for significant, but uniform shrinkage around a highly contoured container.

By contrast, in Example 24, the shrinkage in the principal direction at 70 C after 5 and 10 seconds was 9 and 15% respectively. At 80° C. the shrinkages were 41 and 45% respectively. Maximum off-axis shrinkage was 3%. This example illustrates a shrink film with a more gradual increase in shrinkage with temperature and which would be more useful in, for example, a hot air type shrink tunnel where temperature control is not precise.

Example 25

Low Temperature Onset Shrink Film

In this prophetic example, the polyester matrix of the previous examples is replaced with Eastman EASTO-BOND™ copolyester, a high DEG, low Tg copolyester (Tg=55° C.). EASTOBOND™ has approximately the same surface tension, refractive index, and viscosity as the previous copolyester, thus good mixing will occur using the voiding agents described previously (e.g. the 60 wt % CA/40 wt % EMAC additive). Thus, for example, the shrinkage will begin at approximately 50° C. and reaching a maximum shrinkage by approximately 65° C. The ultimate shrinkage will depend on stretch temperature and stretch ratio. For a nominal stretch temperature of 65° C. and a stretch ratio of 5×, the ultimate shrinkage will be approximately 60 to 75%. A film of this type is useful, for example in applications where very low shrinkage temperatures are required, such as with film that could be activated for home use, via a standard hair dryer.

Example 26

Stiffness Properties of the Oriented Film

The film modulus in the off-axis (i.e. non-shrink direction) is particularly important for allowing a shrink sleeve to be applied over a bottle without crushing or buckling. Off-axis moduli were determined for Examples 4 through 15 and Examples 23 and 24 and are Tabulated in Table IV. A direct correlation between modulus and density was found based on linear regression.

$$E=2.04*\text{density}-1.15$$

where E is the modulus (GPa) and the density is in units of g/cc. While this correlation was matrix dependent, it is believed to be reasonably accurate for most of the typical polyesters used in shrink film because most polyesters have approximately the same neat modulus. The correlation also illustrates the strong dependence of the modulus on the density (voids have no stiffness). Slight variations from this line resulted from variations in the stiffness of the voiding agents. For example, Examples 9 and 15, which contained none of the softer EMAC material, had higher moduli at constant density than the other films that contained EMAC. Thus for a given density target, it was possible to tweak the modulus slightly through composition, although stiffness was primarily density dependent.

Example 38

Sleeve Buckling Strength

The correlation between modulus and density was used to correlate the density to the crush strength of the sleeve. The buckling strength of a thin wall tube with an applied topload is well documented in the engineering literature (see for example "Roark's Formulas for Stress and Strain" by W. C. Young, 6$^{th}$ Edition, McGraw-Hill, New York, page 689 (1989)). For the geometry of a typical sleeve, the topload stress σ at which point buckling/collapsing will occur is $$\sigma=0.3Et/R$$

where E is the modulus (in Pascals), R is the radius and t is the thickness (in meters). Topload stress can be converted to a top load force G (in Newtons) at the onset of buckling:

$$G=0.6\pi Et^2$$

By substituting for E as a function of density, the following formula is obtained:

$$G=0.6\pi(2.04*\text{density}-1.15)t^2$$

This expression gives the top load strength as a function of density and thickness. As the degree of microvoiding increases and the density decreases, the thickness has to be increased to compensate. Notice that ring crush/buckling strength is a function of thickness squared but only a linear function of the density/modulus. It is also dependent on the uniformity of film gauge with highly uneven thicknesses showing lower strengths.

As an example, the top load strength was measured on Comparative Example 8 and Examples 23 and 24 using a procedure similar to that outlined in Tappi 822 for paperboard. A hoop of film 50 mm in diameter, and 12 mm wide was tested with a crosshead load rate of 13 mm/min. The load direction was such that the non-shrink direction of the film was along the axial direction. The onset of buckling was obtained from the force vs. time plot during loading (average of five measurements). For unvoided the film from Comparative Example 8, with a thickness of 55 um ($55^{-6}$ meters), the measured buckling strength was 11.2 Newtons and the predicted value was 9.2 Newtons, which are in good agreement. The films from Examples 23 and 24 had thicknesses 45 and 57 microns respectively. For the film from Example 23, the measured crush strength was 3.9 Newtons and the predicted value was 3.6 Newtons. For the film from Example 24, the measured value was 7.1 Newtons and the predicted value was 5.9 Newtons. All of the experimental and predicted values are in good agreement and within experimental error thereby verifying the equations. Thus, if there is a minimum crush strength requirement for a given label applicator, one can use the above equations to give the required thickness of the film as a function of density so as to meet the crush strength.

TABLE I

Nominal Property Data at Room Temperature

| Polymer | Refractive Index (n) | Surface Tension (dynes/cm) | Modulus (GPa) |
| --- | --- | --- | --- |
| cellulose | 1.540 | 36–42 | 1.5 |
| cellulose acetate | 1.473 | 39–46 | 1.8 |
| cellulose acetate butyrate | 1.480 | 34 | 1.3 |
| cellulose acetate propionate | 1.476 | 36–42 | 1.7 |
| nitrocellulose | 1.510 | 38 | 15 |
| nylon 6, 6 | 1.530 | 42–47 | 2.1 |
| MXD-6 nylon | 1.582 | 42–47 | 4.7 |
| polyethylene | 1.490 | 31–37 | 0.5 |
| polyethylene methacrylic acid copolymer (ionomer) | 1.510 | 41–60 | 0.08 |
| polypropylene | 1.490 | 29–30 | 1.5 |
| poly(ethylene methyl acrylate) copolymer (EMAC) | 1.496 | 34 | 0.03 |
| poly(butylene methyl acrylate) copolymer (EBAC) | 1.495 | 33 | 0.03 |

TABLE I-continued

Nominal Property Data at Room Temperature

| Polymer | Refractive Index (n) | Surface Tension (dynes/cm) | Modulus (GPa) |
|---|---|---|---|
| polystyrene | 1.591 | 33–36 | 3 |
| styrene-butadiene-styrene (SBS) | 1.570 | 33–36 | 1.8 |
| polymethylpentene | 1.460 | 25 | 1.9 |
| poly(ethylene vinyl acetate) | 1.460 | 30–36 | 0.08 |
| poly vinyl alcohol | 1.500 | 37 | 2.7 |
| PVC | 1.539 | 42 | 2.7 |
| polycarbonate | 1.585 | 45 | 2.4 |
| PET | 1.571 | 43 | 2.6 |
| PBT | 1.57–1.60 | 38–40 | 2.1 |
| polyester-ether (HYTREL ™, ECDEL ™) | — | 38–42 | 0.16–0.17 |
| PETG | 1.563 | 41–43 | 1.9 |
| Embrace ™ copolyester | 1.565 | 41–42 | 1.6 |
| PMMA | 1.479 | 39 | 3.4 |
| PTFE | 1.350 | 24 | 0.61 |
| poly(acrylonitrile) | 1.514 | 50 | >1 GPa |
| polyimides | 1.640–1.670 | 38–41 | 2.5 |

TABLE II

Property Data for Blends

| Example # | Matrix Polymer | Polymer 1 | Polymer 2 | Surface Tension Difference Between Polymer 1 and Matrix | Surface Tension Difference Between Polymer 2 and Matrix | Viscosity Ratio (Polymer 2 over Matrix) | Film Quality |
|---|---|---|---|---|---|---|---|
| C1 | copolyester | cellulose acetate | — | 2 dyne/cm | — | — | good |
| C2 | copolyester | — | PP | | 12 dyne/cm | 0.6 | poor |
| C3 | copolyester | — | LLDPE | | 10 dyne/cm | 1.6 | poor |
| C4 | copolyester | — | LLDPE | | 10 dyne/cm | 1.6 | poor |
| C5 | copolyester | MBS | SBS | 6 dyne/cm | 10 dyne/cm | 1.3 | fair |
| 1 | copolyester | cellulose acetate | EMAC | 2 dyne/cm | 8 dyne/cm | 0.9 | excellent |
| C6 | copolyester | cellulose acetate | EBAC | 2 dyne/cm | 9 dyne/cm | 3.6 | good |
| C7 | copolyesters | cellulose acetate | — | 2 dyne/cm | — | — | good |
| 2 | copolyester | cellulose acetate | EMAC | 2 dyne/cm | 8 dyne/cm | 0.9 | excellent |
| 3 | copolyester | cellulose acetate | EMAC | 2 dyne/cm | 8 dyne/cm | 0.9 | excellent |
| C8 | copolyester | — | — | — | — | — | N/A |
| 4 | copolyester | cellulose acetate | EMAC | 2 dyne/cm | 8 dyne/cm | 0.9 | excellent |
| 5 | copolyester | cellulose acetate | EMAC PS | 2 dyne/cm | 8 dyne/cm 6 dynes/cm | 0.9 0.3 | excellent |
| 6 | copolyester | cellulose acetate | EMAC PS | 2 dyne/cm | 8 dyne/cm 6 dynes/cm | 0.9 0.3 | excellent |
| 7 | copolyester | cellulose acetate | EMAC PP | 2 dyne/cm | 8 dyne/cm 12 dyne/cm | 0.9 0.6 | excellent |
| 8 | copolyester | cellulose acetate | EMAC PP | 2 dyne/cm | 8 dyne/cm 12 dyne/cm | 0.9 0.6 | excellent |
| 9 | copolyester | cellulose acetate | PP | 2 dyne/cm | 12 dyne/cm | 0.6 | excellent |
| 10 | copolyester | cellulose acetate | EMAC | 2 dyne/cm | 8 dyne/cm | 0.9 | excellent |
| 11 | copolyester | cellulose acetate | EMAC PS | 2 dyne/cm | 8 dyne/cm 6 dynes/cm | 0.9 0.3 | good |
| 12 | copolyester | cellulose acetate | EMAC PS | 2 dyne/cm | 8 dyne/cm 6 dynes/cm | 0.9 0.3 | good |
| 13 | copolyester | cellulose acetate | EMAC PP | 2 dyne/cm | 8 dyne/cm 12 dyne/cm | 0.9 0.6 | excellent |
| 14 | copolyester | cellulose acetate | EMAC PP | 2 dyne/cm | 8 dyne/cm 12 dyne/cm | 0.9 0.6 | excellent |
| 15 | copolyester | cellulose acetate | PP | 2 dyne/cm | 12 dyne/cm | 0.6 | excellent |
| C9 | 60/40 SBS/PS | EMAC | cellulose acetate | 2 dyne/cm | 8 dyne/cm | >3.5 | poor |
| 16 | copolyester | CAP | EMAC PP | 2 dyne/cm | 8 dyne/cm 12 dyne/cm | 0.9 0.6 | excellent |
| 17 | nylon | cellulose acetate | PP EMAC PS | 1 dyne/cm | 15 dyne/cm 11 dyne/cm 9 dyne/cm | 0.7 1 0.2 | good |
| 18 | PC | cellulose acetate | PP EMAC PS | 1 dyne/cm | 15 dyne/cm 11 dyne/cm 9 dyne/cm | 0.4 0.5 0.1 | fair |
| C10 | PET polyester | cellulose acetate | PP | 3 dyne/cm | 13 dyne/cm | 5 | fair |
| C11 | copolyester | PS | PP PMP | 6 dyne/cm | 12 dyne/cm 17 dyne/cm | N/A | N/A |
| 19 | copolyester | PET polyester | EMAC | 1–3 dyne/cm | 8 dyne/cm | 0.9 | N/A |

TABLE III

Data for Oriented Films (Comparative Examples C1–C8 and Examples 1–15)

| Example # | Description | Stretch Method | Stretch Ratio | Stretch Temp. °C. | Density (Gradient), Film | Measured Film Thickness, mils | Tot. Transmit. | Absorptivity (1/cm) | Ultimate Shrinkage, % | Shrink Stress (100%) Mpa | Solvent Seaming | Surface Energy (dyn/cm) |
|---|---|---|---|---|---|---|---|---|---|---|---|---|
| C1 | 90/10 polyester/CA | tenter | 5.2 × 1 | 85 | 1.03–1.05 | 2.5 | 27 | 200 | 72 | 16.1 | strong | 59 |
| C2 | 90/10 polyester/PP | tenter | 5.2 × 1 | 80 | 1.12–1.15 | 2.2 | 82 | 28 | 36 | 14.4 | medium | 45 |
| C3 | 90/10 polyester/LLDPE | tenter | 6 × 1 | 80 | 1.19 | 1.95 | 89 | 15 | 21 | 15.2 | strong | 43 |
| C4 | 90/10 polyester/LLDPE | drafter | 6 × 1 | 82 | 1.02 | 2.5 | 39 | 142 | 59 | 17.8 | poor | 53 |
| C5 | 80/15/5 polyester/SBS/MBS | drafter | 6 × 1 | 82 | 0.98 | 2.2 | 32 | 197 | 70 | 17.2 | medium | 55 |
| 1 | 80/15/5 polyester/CA/EMAC | TM Long | 5 × 1 | 85 | ~1 | 2.9 | 24 | 188 | 62 | 10.6 | strong | 40 |
| C6 | 80/15/5 polyester/CA/EBAC | TM Long | 5 × 1 | 85 | ~1 | 2.9 | 37 | 129 | 62 | 12.4 | medium | 43 |
| C7 | 85/15 polyester/CA | TM Long | 5 × 1 | 85 | ~1 | 2.3 | 47 | 122 | 63 | 16.5 | strong | 44 |
| 2 | 84/10/6 polyester/CA/EMAC | tenter | 5.5 × 1 | 89 | 1.01 | 2.3 | 29 | 205 | 71 | 9.8 | medium | 45 |
| 3 | 75/15/10 polyester/CA/EMAC | tenter | 5.5 × 1 | 89 | 0.9 | 2.5 | 26 | 206 | 64 | 7.4 | strong | 57 |
| C8 | 100% polyester (no voids) | TM Long | 5.5 × 1 | 85 | 1.3 | 2.5 | 92 | 7 | 75 | 14.3 | strong | 41 |
| 4 | 75/15/10 polyester/CA/EMAC | TM Long | 5.5 × 1 | 80 | 0.86 | 3.2 | 12 | 256 | 73 | 8.40 | strong | 46 |
| 5 | 75/15/5/5 polyester/CA/EMAC/PS | TM Long | 5.5 × 1 | 80 | <0.82 | 4 | 8 | 245 | 71 | 6.89 | poor | 47 |
| 6 | 75/10/10/5 polyester/CA/EMAC/PS | TM Long | 5.5 × 1 | 80 | 0.86 | 3.8 | 13 | 207 | 73 | 6.71 | strong | 51 |
| 7 | 75/15/5/5 polyester/CA/EMAC/PP | TM Long | 5.5 × 1 | 80 | 0.86 | 3.6 | 12 | 227 | 73 | 6.51 | medium | 47 |
| 8 | 75/10/10/5 polyester/CA/EMAC/PP | TM Long | 5.5 × 1 | 80 | 0.91 | 3 | 13 | 262 | 72 | 7.35 | strong | 41 |
| 9 | 75/12.5/12.5 polyester/CA/PP | TM Long | 5.5 × 1 | 80 | 0.83 | 3.2 | 9 | 291 | 66 | 8.61 | medium | 37 |
| 10 | 65/20/15 polyester/CA/EMAC | TM Long | 5 × 1 | 85 | <0.82 | 4 | 8 | 245 | 68 | 5.17 | medium | 51 |
| 11 | 65/20/7.5/7.5 polyester/CA/EMAC/PS | TM Long | 5 × 1 | 85 | <0.82 | 4.8 | 7 | 215 | 58 | 4.16 | poor | 59 |
| 12 | 65/15/10/10 polyester/CA/EMAC/PS | TM Long | 5 × 1 | 85 | 0.87 | 4 | 10 | 223 | 63 | 5.34 | strong | 57 |
| 13 | 65/20/7.5/7.5 polyester/CA/EMAC/PP | TM Long | 5 × 1 | 85 | 0.83 | 4 | 12 | 205 | 71 | 5.00 | strong | 45 |

TABLE III-continued

Data for Oriented Films (Comparative Examples C1–C8 and Examples 1–15)

| Example # | Description | Stretch Method | Stretch Ratio | Stretch Temp. °C. | Density (Gradient), Film | Measured Film Thickness, mils | Tot. Transmit. | Absorptivity (1/cm) | Ultimate Shrinkage, % | Shrink Stress (100%) Mpa | Solvent Seaming | Surface Energy (dyn/cm) |
|---|---|---|---|---|---|---|---|---|---|---|---|---|
| 14 | 65/15/10/10 polyester/ CA/ EMAC/PP | TM Long | 5 × 1 | 85 | 0.9 | 3.6 | 17 | 189 | 68 | 4.98 | Poor | 39 |
| 15 | 65/17.5/17.5 polyester/ CA/PP | TM Long | 5 × 1 | 85 | <0.82 | 4 | 8 | 245 | 68 | 5.17 | Poor | 36 to 38 |

TABLE IV

Off Axis Modulus vs. Density Data for Example 26

| Example # | Density (g/cc) | E (GPa) |
|---|---|---|
| 4 | 0.86 | 0.57 |
| 5 | 0.82 | 0.46 |
| 6 | 0.86 | 0.54 |
| 7 | 0.86 | 0.52 |
| 8 | 0.91 | 0.65 |
| 9 | 0.83 | 0.69 |
| 10 | 0.82 | 0.46 |
| 11 | 0.82 | 0.49 |
| 12 | 0.87 | 0.63 |
| 13 | 0.83 | 0.49 |
| 14 | 0.90 | 0.68 |
| 15 | 0.82 | 0.58 |
| 23 | 0.99 | 0.94 |
| 24 | 0.97 | 0.97 |
| C8 | 1.30 | 1.61 |
| C8 (repeat) | 1.30 | 1.33 |

We claim:

1. A composition, comprising:
    (i) a polymer matrix comprising one or more polymers selected from the group consisting of: polyesters, polylactic acid, polyketones, polyamides, polysulfones, fluoropolymers, polyacetals, polyimides, polycarbonates, and copolymers thereof;
    wherein said polymer matrix has a glass transition temperature (Tg) of at least 50° C.;
    (ii) a voiding agent dispersed within said polymer matrix, comprising at least one first, non-crosslinked, polymer and at least one second, non-crosslinked, polymer wherein said first polymer has a Tg or a melting point temperature (Tm) greater than the Tg of said polymer matrix, a tensile modulus of at least 1 CPa, and a surface tension that differs from the surface tension of said polymer matrix by an absolute value of 5 dynes/cm or less; and said second polymer has a surface tension that differs from the surface tension of said polymer matrix by an absolute value of at least 5 dynes/cm and a melt viscosity wherein the ratio of said melt viscosity of said second polymer to the melt viscosity of said polymer matrix is about 0.1 to about 1.8.

2. The composition of claim 1 which is stretched in one or more directions at or above the Tg of said matrix polymer at a stretch ratio of at least 1.5.

3. The composition of claim 2 wherein said first polymer comprises one or more polymers selected from the group consisting of cellulosic polymers, starch, esterified starch, polyketones, polyesters, polyamides, polysulfones, fluoropolymers, polyacetals, polyimides, polycarbonates, olefinic polymers, and copolymers thereof; and said second polymer comprises one or more polymers selected from the group consisting of polyamides, polyketones, polysulfones, polyesters, fluoropolymers, polyacetals, polycarbonates, olefinic polymers, and copolymers thereof.

4. The composition of claim 3 wherein said first polymer is a cellulosic polymer comprising microcrystalline cellulose, a cellulose ester, a cellulose ether, or combinations thereof.

5. The composition of claim 4 wherein said cellulose ester comprises cellulose acetate, cellulose triacetate, cellulose acetate propionate, cellulose acetate butyrate, or combinations thereof; and said cellulose ether comprises hydroxypropyl cellulose, methyl ethyl cellulose, or carboxymethyl cellulose, or combinations thereof.

6. The composition of claim 5 wherein said first polymer comprises cellulose acetate, cellulose acetate propionate, or a combination thereof; and said second polymer comprises polystyrene, polypropylene, ethylene methyl acrylate copolymer, or combinations thereof.

7. The composition of claim 5 wherein said voiding agent comprises about 5 to about 95 weight percent of said first polymer, based on the total weight of said voiding agent.

8. The composition of claim 4 wherein said second polymer comprises one or more polymers selected from the group consisting of polyethylene, polystyrene, polypropylene, and copolymers thereof.

9. The composition of claim 8 wherein said second polymer comprises ethylene vinyl acetate, ethylene vinyl alcohol copolymer, ethylene methyl acrylate copolymer, ethylene butyl acrylate copolymer, ethylene acrylic acid copolymer, ionomer, or combinations thereof.

10. A composition, comprising: a polymer matrix, at least one first, non-crosslinked polymer, and at least one second, non-crosslinked polymer each dispersed within said polymer matrix, wherein said first polymer is a cellulosic polymer comprising one or more of: microcrystalline cellulose, a cellulose ester, or a cellulose ether, has a Tg or a Tm greater than the Tg of said polymer matrix, and a surface tension that differs from the surface tension of said polymer matrix by an absolute value of 3 dynes/cm or less; and said second polymer comprises one or more polymers selected from the group consisting of polyethylene, polystyrene, polypropylene, and copolymers thereof, has a a surface tension that differs from the surface tension of said polymer matrix by an absolute value of at least 6 dynes/cm and a melt viscosity wherein the ratio of melt viscosity of said second polymer to the melt viscosity of said polymer matrix is about 0.1 to about 1.8.

11. The composition of claim 10 wherein said polymer matrix comprises one or more polymers selected from the group consisting of: polyesters, polylactic acid, polyketones, vinyl polymers, polyamides, polysulfones, fluoropolymers, polyacetals, polyimides, polycarbonates, and copolymers thereof.

12. The composition of claim 11 wherein said second polymer has a Tg or a Tm greater than the Tg of said polymer matrix, and wherein said composition further comprises a third polymer dispersed within said polymer matrix having a surface tension that is between the surface tension of said polymer matrix and said second polymer, and a density of 1.1 g/cc or less.

13. The composition of claim 12 wherein said first polymer comprises cellulose acetate, cellulose acetate propionate, or a combination thereof, and said second polymer comprises polystyrene, polypropylene, ethylene methyl acrylate copolymer, or combinations thereof.

14. The composition of claim 13 wherein said first polymer comprises cellulose acetate, said second polymer comprises polypropylene, and said third polymer comprises ethylene methyl acrylate copolymer.

15. The composition of claim 11 wherein said polymer matrix is oriented.

16. A void-containing, shaped article comprising an oriented polymer matrix having dispersed therein a voiding agent comprising at least one first, non-crosslinked polymer and at least one second, non-crosslinked polymer, wherein said first polymer comprises microcrystalline cellulose, a cellulose ester, a cellulose ether, or combinations thereof, has a Tg or a Tm greater than the Tg of said polymer matrix, and a surface tension that differs from the surface tension of said polymer matrix by an absolute value of 5 dynes/cm or less; and said second polymer comprises one or more polymers selected from the group consisting of polyethylene, polystyrene, polypropylene, and copolymers thereof, has a surface tension that differs from the surface tension of said polymer matrix by an absolute value of at least 5 dynes/cm, and a melt viscosity wherein the ratio of melt viscosity of said second polymer to the melt viscosity of said polymer matrix is about 0.1 to about 1.8.

17. The shaped article of claim 16 wherein said article comprises at least 50 weight percent of said polymer matrix based on the total weight of said article.

18. The shaped article of claim 17 wherein said polymer matrix comprises one or more polymers selected from the group consisting of: polyesters, polylactic acid, polyketones, polyamides, polysulfones, polyimides, olefinic polymers, polycarbonates, and copolymers thereof.

19. The shaped article of claim 18 wherein said polymer matrix comprises one or more polyesters selected from the group consisting of poly(ethylene terephthalate), poly(butylene terephthalate), poly(1,3-trimethylene terephthalate), and poly(cyclohexylene terephthalate).

20. The shaped article of claim 18 wherein said polymer matrix comprises a polyester comprising (i) diacid residues comprising at least 80 mole percent, based on the total moles of diacid residues, of the residues of terephthalic acid, naphthalenedicarboxylic acid, 1,4 cyclohexanedicarboxylic acid, isophthalic acid, or combinations thereof; and (ii) diol residues comprising 10 to 100 mole percent, based on the total moles of diol residues, of residues of 1,4-cyclohexanedimethanol, 1,3-cyclohexanedimethanol, neopentyl glycol, diethylene glycol, or combinations thereof; and 0 to 90 mole percent of the residues of ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, polyalkylene glycol, or combinations thereof.

21. The shaped article of claim 20 wherein said first polymer comprises cellulose acetate, cellulose acetate propionate, or a combination thereof, and said second polymer comprises polystyrene, polypropylene, ethylene methyl acrylate copolymer, or combinations thereof.

22. The shaped article of claim 21 wherein said diacid residues comprise at least 95 mole percent of the residues of terephthalic acid; said diol residues comprise about 10 to about 40 mole percent of the residues of 1,4-cyclohexanedimethanol, about 1 to about 25 mole percent of the residues of diethylene glycol, and about 35 to about 89 mole percent of the residues ethylene glycol; said first polymer comprises cellulose acetate; and said second polymer comprises polypropylene and ethylene methyl acrylate copolymer.

23. The shaped article of claim 16 wherein said second polymer has a Tg or a Tm greater than the Tg of said polymer matrix and wherein said voiding agent further comprises a third polymer having a surface tension that is between the surface tension of said polymer matrix, and said second polymer, and a density of 1.1 g/cc or less.

24. The shaped article of claim 16 wherein said article is produced by extrusin, calendering, thermoforming, blow-molding, casting, spinning, drafting, tentering, or blowing.

25. The shaped article of claim 24 wherein article is a fiber, sheet, film, tube, bottle, or profile.

26. The shaped article of claim 25 wherein said film comprises at least one layer and has a shrinkage of at least 5 percent after 10 seconds in a water bath at 70° C.

27. A process for the preparation of a void-containing, shaped article, comprising: (i) mixing a polymer matrix and a voiding agent at a temperature at or above the Tg of said polymer matrix to form a uniform dispersion of said voiding agent within said polymer matrix, wherein said voiding agent comprises at least one first, non-crosslinked polymer and at least one second, non-crosslinked polymer, wherein said first polymer comprises microcrystalline cellulose, a cellulose ester, a cellulose ether, or combinations thereof, has a Tg or a Tm greater than the Tg of said polymer matrix, and a surface tension that differs from the surface tension of said polymer matrix by an absolute value of 5 dynes/cm or less; and said second polymer comprises one or more polymers selected from the group consisting of polyethylene, polystyrene, polypropylene, and copolymers thereof, has a surface tension that differs from the surface tension of said polymer matrix by an absolute value of at least 5 dynes/cm, and a melt viscosity wherein the ratio of melt viscosity of said second polymer to the melt viscosity of said polymer matrix is about 0.1 to about 1.8; (ii) forming a shaped article; (iii) orienting said shaped article, and (iv) optionally, heatsetting said shaped article of step(iii).

28. The process of claim 27 wherein said orientation is by stretching in one or more directions.

\* \* \* \* \*

UNITED STATES PATENT AND TRADEMARK OFFICE
CERTIFICATE OF CORRECTION

PATENT NO. : 7,273,894 B2  Page 1 of 1
APPLICATION NO. : 10/942719
DATED : September 25, 2007
INVENTOR(S) : Shelby et al.

It is certified that error appears in the above-identified patent and that said Letters Patent is hereby corrected as shown below:

Column 41, Line 52, (Claim 1)
"CPa" should be --GPa--

Column 42, Line 31, (Claim 5)
reads "... cellulose, methyl ethyl cellulose, or carboxymethyl"
but should read --... cellulose, methyl ethyl cellulose, carboxymethyl--

Column 42, Line 55, (Claim 10)
reads "...comprising one or more of: microcrystalline..."
but should read --...comprising microcrystalline...--

Column 42, Line 56, (Claim 10)
reads "a cellulose ester, or a cellulose ether,..."
but should read --a cellulose ester, a cellulose ether, or combinations thereof,--

Column 43, Line 62, (Claim 20)
reads "...residues, of residues of..."
but should read "...residues, of the residues of...--

Signed and Sealed this

Nineteenth Day of August, 2008

JON W. DUDAS
*Director of the United States Patent and Trademark Office*